(12) United States Patent
Bunha et al.

(10) Patent No.: US 11,177,076 B2
(45) Date of Patent: *Nov. 16, 2021

(54) CONDUCTIVE POLYMER CAPACITOR FOR IMPROVED RELIABILITY

(71) Applicant: KEMET Electronics Corporation, Fort Lauderdale, FL (US)

(72) Inventors: Ajaykumar Bunha, Simpsonville, SC (US); Antony P. Chacko, Simpsonville, SC (US); Qingping Chen, Simpsonville, SC (US); Yaru Shi, Simpsonville, SC (US); Philip M. Lessner, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/023,870

(22) Filed: Sep. 17, 2020

(65) Prior Publication Data

US 2021/0005396 A1     Jan. 7, 2021

Related U.S. Application Data

(60) Continuation-in-part of application No. 16/165,649, filed on Oct. 19, 2018, now Pat. No. 10,650,980.
(Continued)

(51) Int. Cl.
*H01G 9/00* (2006.01)
*C09D 5/24* (2006.01)
(Continued)

(52) U.S. Cl.
CPC .......... *H01G 9/0036* (2013.01); *C08F 12/30* (2013.01); *C08F 212/14* (2013.01); *C09D 4/06* (2013.01);
(Continued)

(58) Field of Classification Search
None
See application file for complete search history.

(56) References Cited

U.S. PATENT DOCUMENTS 5,300,575 A    4/1994  Jonas et al.
6,000,840 A    12/1999 Paterson
(Continued)

FOREIGN PATENT DOCUMENTS

EP       1524678       4/2005
EP       1746613       1/2007
WO    WO 2010089111    2/2010

OTHER PUBLICATIONS

ISA/US; International Search Report and Written Opinion prepared for PCT/US2021/041585; dated Aug. 4, 2021.

*Primary Examiner* — Katie L. Hammer
(74) *Attorney, Agent, or Firm* — Joseph T. Guy; Patent Filing Specialist Inc.

(57) ABSTRACT

A capacitor comprising an anode foil; and a conductive polymer layer on the anode foil. The conductive polymer layer comprises first particles comprising conductive polymer and polyanion and second particles comprising the conductive polymer and the polyanion wherein the first particles have an average particle diameter of at least 1 micron to no more than 10 microns. The second particles have an average particle diameter of at least 1 nm to no more than 600 nm.

54 Claims, 13 Drawing Sheets

Related U.S. Application Data which is a division of application No. 15/787,126, filed on Oct. 18, 2017, now Pat. No. 10,658,121.

(51) Int. Cl.

| | | |
|---|---|---|
| *C09D 165/00* | (2006.01) | |
| *C09D 4/06* | (2006.01) | |
| *C09D 125/18* | (2006.01) | |
| *C09D 7/65* | (2018.01) | |
| *H01G 9/15* | (2006.01) | |
| *H01G 9/025* | (2006.01) | |
| *C08F 12/30* | (2006.01) | |
| *H01B 1/12* | (2006.01) | |
| *C08F 212/14* | (2006.01) | |
| *C09D 133/14* | (2006.01) | |
| *H01G 9/028* | (2006.01) | |
| *H01G 9/042* | (2006.01) | |

(52) U.S. Cl.
CPC ............. *C09D 5/24* (2013.01); *C09D 7/65* (2018.01); *C09D 125/18* (2013.01); *C09D 133/14* (2013.01); *C09D 165/00* (2013.01); *H01B 1/127* (2013.01); *H01G 9/025* (2013.01); *H01G 9/028* (2013.01); *H01G 9/042* (2013.01); *H01G 9/15* (2013.01); *C08G 2261/3221* (2013.01); *C08G 2261/3223* (2013.01); *C08G 2261/512* (2013.01); *C08G 2261/794* (2013.01)

(56) References Cited

U.S. PATENT DOCUMENTS

| | | | |
|---|---|---|---|
| 6,987,663 B2* | 1/2006 | Merker | H01G 9/10 |
| | | | 361/523 |
| 7,270,871 B2 | 9/2007 | Jiang et al. | |
| 7,411,779 B2* | 8/2008 | Merker | H01G 9/028 |
| | | | 361/523 |
| 7,563,290 B2 | 7/2009 | Qiu et al. | |
| 7,754,276 B2 | 7/2010 | Qiu et al. | |
| 7,990,683 B2 | 8/2011 | Qiu | |
| 7,990,684 B2 | 8/2011 | Sugihara et al. | |
| 9,030,806 B2 | 5/2015 | Chacko et al. | |
| 10,943,742 B2* | 3/2021 | Bunha | C09D 133/06 |
| 2007/0171597 A1* | 7/2007 | Merker | H01G 9/0036 |
| | | | 361/523 |
| 2011/0049433 A1 | 3/2011 | Jonas et al. | |
| 2013/0222978 A1* | 8/2013 | Sugawara | H01G 9/025 |
| | | | 361/528 |
| 2015/0140203 A1 | 5/2015 | Intelmann et al. | |
| 2015/0255221 A1 | 9/2015 | Asteman | |
| 2015/0262754 A1* | 9/2015 | Nagashima | H01G 9/0036 |
| | | | 427/79 |
| 2015/0348715 A1 | 12/2015 | Chacko | |
| 2016/0012973 A1* | 1/2016 | Takatani | H01G 9/0036 |
| | | | 361/528 |
| 2016/0211081 A1 | 7/2016 | Chacko | |
| 2016/0285074 A1 | 9/2016 | Yamafuku | |
| 2017/0186553 A1 | 6/2017 | Intelmann | |
| 2017/0338047 A1 | 11/2017 | Bunha | |

* cited by examiner

CONDUCTIVE POLYMER CAPACITOR FOR IMPROVED RELIABILITY

CROSS-REFERENCE TO RELATED APPLICATIONS

The present invention is a continuation-in-part of pending U.S. patent application Ser. No. 16/435,762 filed Jun. 10, 2019 which is a continuation-in-part of U.S. patent application Ser. No. 16/165,649 filed Oct. 19, 2018 now U.S. Pat. No. 10,650,980 issued May 12, 2020 which, in turn, is a divisional application of U.S. patent application Ser. No. 15/787,126 filed Oct. 18, 2017 now U.S. Pat. No. 10,658,121 issued May 19, 2020 all of which are incorporated herein by reference.

BACKGROUND

The present invention is related to improved solid electrolytic capacitors comprising conductive polymeric cathodes. More specifically, the present invention is related to improvements in the conductive polymer wherein the improved polymer composition provides improved coverage, particularly on edges and corners, thereby providing a capacitor with improved ESR and improved leakage stability in humid environments.

Solid electrolytic capacitors are widely used throughout the electronics industry. In high voltage applications capacitors with a solid electrolyte, formed by conductive polymer dispersions, give excellent high voltage performance compared to conductive polymer cathodes formed in-situ. These conductive polymer dispersions are prepared by a number of process steps including polymerization, purification, filtration, homogenization, evaporation, etc. Descriptions of these processes are provided in U.S. Pat. Nos. 5,300,575; 7,990,684; 7,270,871; 6,000,840 and 9,030,806; U.S. Patent Publication No. 2011/0049433 and PCT Publication WO 2010/089111 each of which is incorporated herein by reference.

Capacitors and methods of making capacitors are provided in U.S. Pat. Nos. 7,990,683; 7,754,276; 7,563,290; 10,770,240 and 9,343,239 each of which is incorporated herein by reference.

Solid electrolytic capacitors comprising conducting polymer, as the cathode, have several disadvantages. One disadvantage is the difficulty associated with covering edges and corners of the dielectric. Poor coverage of conducting polymers on corners and edges of anodized anodes results in high DC leakage current and causes reliability problems in humid atmosphere.

Equivalent Series Resistance (ESR) stability of the capacitors requires that the interface between the cathode layer, cathodic conductive layers, conductive adhesive, and leadframe have good mechanical integrity during thermo mechanical stresses. Solid electrolytic capacitors are subject to various thermomechanical stresses during assembly, molding, board mount reflow etc. During board mount the capacitors are subjected to temperatures above 250° C. These elevated temperatures create stresses in the interfaces due to coefficient of thermal expansion (CTE) mismatches between the interfaces. The resultant stress causes mechanical weakening of the interfaces. In some cases this mechanical weakening causes delamination. Any physical separation between the interfaces causes increases in electrical resistance between the interfaces and thus an increased ESR in the finished capacitor. This interfacial weakness also results in higher ESR shift during high humidity environment.

European Patent Application EP-A-1746613 improves the process of forming solid electrolytic capacitor from EP-A-1524678 by virtue of solid particles having a diameter in the range from 0.7 to 20 µm being added to the dispersion. The solid particles are particles of electrically conductive polymer or fillers such as carbonates, silicates, silica, calcium sulphate, barium sulphate, aluminium hydroxide, glass fibres, glass bulbs, wood flour, cellulose powder, carbon black, silicon oxides or silicon dioxide. The patent claims improved edge and corner coverage by addition of the aforementioned particles in conductive polymer polyanion dispersion. However, the solid particles of conductive polymer does not contain polyanion which makes it non-disperive or insoluble in water. Thus, the addition of solid particles of conducting polymer in conducting polymer: polyanion dispersion can affect dispersion stability, causes the dispersion to have a very high viscosity, settlements of solid particles in the dispersion, and results in poor reproducibility in performance. Moreover, as mentioned in US Patent Pub. No. 2015/0140203 A1, the solid particles makes the polymeric outer film brittle, which can cause the outer layer to flake off locally resulting in an increase in the residual current and in the ESR.

To improve coverage without affecting polymeric outer layer film strength, WO2010089111A1, which is incorporated herein by reference, reported the use of a group of chemical compounds, referred to as crosslinkers or primers, which are mostly multi-cationic salts or amines. The crosslinker is applied to the anodized anode prior to the application of polymer slurry to achieve good polymer coverage on corners and edges of the anodized anode. The use of crosslinker eliminated the need of solid particles in conducting polymer dispersions for coverage improvement. The effectiveness of the crosslinker is attributed to the crosslinking ability of multi-cationic salts or amines to the slurry/dispersion particles. While crosslinkers are advantageous for improving the coating coverage on corners and edges of the anodized anode, the addition of these crosslinkers, which are mostly ionic in nature, has the unintended consequences of degrading the performance under humidity such as high ESR shift and increased DC leakage in a finished product.

There was been an ongoing need for an improved conductive polymer capable of achieving better corner and edge coverage in a solid electrolytic capacitor, and process for forming the capacitor, without degrading the ESR and leakage reliability performance in humid conditions.

SUMMARY OF THE INVENTION

It is an object of the present invention to provide an improved conductive polymer capable of providing better corner and edge coverage in capacitor.

It is another object of the present invention to provide an improved capacitor with improved properties, particularly for use in humid condition.

These and other advantages are realized in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm.

Another embodiment is provided by a solid electrolyte capacitor comprising: an anodized anode and a conductive polymer layer on the anodized anode wherein the conductive polymer layer comprises first particles comprising conductive polymer and polyanion and second particles comprising the conductive polymer and polyanion wherein the first particles have an average particle diameter of at least 1 micron to no more than 10 microns and the second particles have an average particle diameter of at least 1 nm to no more than 600 nm.

Yet another embodiment is provided by a process for forming a dispersion comprising:
providing a monomer and a polyanion in a solution comprising at least 3 wt % to no more than 10 wt % solids of monomer and polyanion; and
polymerization the monomer by high shear polymerization wherein the dispersion comprises first particles comprising conductive polymer and polyanion and second particles comprising the conductive polymer and polyanion wherein the first particles have an average particle diameter of at least 1 micron to no more than 10 microns and the second particles have an average particle diameter of at least 1 nm to no more than 600 nm.

Yet another embodiment is provided in a dispersion comprising:
first particles comprising conductive polymer and polyanion wherein the first particles have an average particle diameter of at least 1 micron to no more than 10 microns;
second particles comprising conductive polymer and polyanion wherein the second particles have an average particle diameter of at least 1 nm to no more than 600 nm;
wherein the conductive polymer comprises conjugated groups having the structure of Formula I:

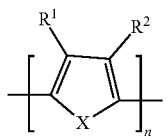

Formula 1 wherein:
$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements;
$R^3$ represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl; and
X is S, N or O; and
the polyanion is represented by Formula 2:

$A_xB_yC_z$  Formula 2 wherein:
A is polystyrenesulfonic acid or salt of polystyrenesulfonate;
B and C separately represent polymerized units substituted with a group selected from:
-carboxyl groups;
—$C(O)OR^6$ wherein $R^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—$(CHR^7CH_2O)_b$—$R^8$ wherein:
$R^7$ is selected from a hydrogen or an alkyl of 1 to 7 carbons;
b is an integer from 1 to the number sufficient to provide a molecular weight of up to 200,000 for the —$CHR^7CH_2$— group; and
$R^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—$C(O)$—$NHR^9$ wherein:
$R^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—$C_6H_4$—$R^{10}$ wherein:
$R^{10}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and
—$(O(CHR^{11}CH_2O)_d$—$R^{12}$ wherein:
$R^{11}$ is a hydrogen or an alkyl of 1 to 7 carbons;
d is an integer from 1 to the number sufficient to provide a molecular weight of up to 200,000 for the —$CHR^{11}CH_2O$— group;
$R^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—$C_6H_4$—O—$R^{13}$ wherein:
$R^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—$(CHR^{14}CH_2O)_e$—$R^{15}$ wherein:
$R^{14}$ is a hydrogen or an alkyl of 1 to 7 carbons;
e is an integer from 1 to the number sufficient to provide a molecular weight of up to 200,000 for the —$CHR^{14}CH_2O$— group; and
$R^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100.

Yet another embodiment is provided in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the conductive polymer layer comprises an internal polymer layer and an external polymer layer and the internal polymer comprises pre-polymerized conductive polymer.

Yet another embodiment is provided in a process for forming a solid electrolyte capacitor comprising:
providing an anodized anode;
applying a layer comprising an organometallic compound on the anodized anode; and forming a pre-polymerized conductive polymer layer on the organometallic compound layer wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the conductive polymer layer comprises an internal polymer layer and an external polymer layer.

Yet another embodiment is provided in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the forming of the conductive layer comprises applying a dispersion comprising the first particles and the second particles; and
wherein a portion of the dispersion is further subjected to rotor-stator high shear mixing, ultrasonic mixing, acoustic mixing, high-pressure homogenizer or a high shearing homogenizer.

Yet another embodiment is provided in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the polyanion is represented by Formula 2:

$$A_xB_yC_z \quad \text{Formula 2}$$

wherein:
A is polystyrenesulfonic acid or salt of polystyrenesulfonate;
B and C separately represent polymerized units substituted with a group selected from:
carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$— group; and
R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{10}$ wherein:
R$^{10}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and
—(O(CHR$^{11}$CH$_2$O)$_d$—R$^{12}$ wherein:
R$^{11}$ is a hydrogen or an alkyl of 1 to 7 carbons;
d is an integer from 1 to the number sufficient to provide a molecular weight of up to 200,000 for the —CHR$^{11}$CH$_2$O— group;
R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
R$^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—(CHR$^{14}$CH$_2$O)$_e$—R$^{15}$ wherein:
R$^{14}$ is a hydrogen or an alkyl of 1 to 7 carbons;
e is an integer from 1 to the number sufficient to provide a molecular weight of up to 200,000 for the —CHR$^{14}$CH$_2$O— group; and
R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100;
wherein the first particles and the second particles are in a dispersion;

wherein a first part of the dispersion is formed by high shear polymerization of a monomer solution and a second part of the dispersion is further subjected to rotor-stator high shear mixing, ultrasonic mixing, acoustic mixing, high-pressure homogenizer or a high shearing homogenizer.

Yet another embodiment is provided in a solid electrolyte capacitor comprising:
an anodized anode; and
a conductive polymer layer on the anodized anode wherein the conductive polymer layer comprises an internal polymer layer and an external polymer layer and further comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm;
wherein the polyanion is represented by Formula 2:

$$A_xB_yC_z \qquad \text{Formula 2}$$

wherein:
A is polystyrenesulfonic acid or salt of polystyrenesulfonate;
B and C separately represent polymerized units substituted with a group selected from:
-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$— group; and
R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{10}$ wherein:
R$^{10}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, amide, imide, thiol, alkene, alkyne, phosphate, azide, acrylate, anhydride and
—(O(CHR$^{11}$CH$_2$O)$_d$—R$^{12}$ wherein:
R$^{11}$ is a hydrogen or an alkyl of 1 to 7 carbons;
d is an integer from 1 to the number sufficient to provide a molecular weight of up to 200,000 for the —CHR$^{11}$CH$_2$O— group;
R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
R$^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—(CHR$^{14}$CH$_2$O)$_e$—R$^{15}$ wherein:
R$^{14}$ is a hydrogen or an alkyl of 1 to 7 carbons;
e is an integer from 1 to the number sufficient to provide a molecular weight of up to 200,000 for the —CHR$^{14}$CH$_2$O— group; and
R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100 wherein:
y represents 10 to 30% and z represents 0 to 20% of the sum total of x+y+z; and
wherein the external polymer layer comprises the polyanion.

Yet another embodiment is provided in a dispersion comprising:
first particles comprising conductive polymer and polyanion wherein the first particles have an average particle diameter of at least 1 micron to no more than 10 microns;
second particles comprising the conductive polymer and the polyanion wherein the second particles have an average particle diameter of at least 1 nm to no more than 600 nm;
wherein the conductive polymer comprises conjugated groups having the structure of Formula I:

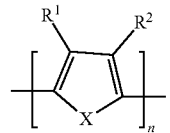

Formula 1 wherein:
R$^1$ and R$^2$ independently represent linear or branched C$_1$-C$_{16}$ alkyl or C$_2$-C$_{18}$ alkoxyalkyl; or are C$_3$-C$_8$ cycloalkyl, phenyl or benzyl which are unsubstituted or substituted by C$_1$-C$_6$ alkyl, C$_1$-C$_6$ alkoxy, halogen or OR$^3$; or R$^1$ and R$^2$, taken together, are linear C$_1$-C$_6$ alkylene which is unsubstituted or substituted by C$_1$-C$_6$ alkyl, C$_1$-C$_6$ alkoxy, halogen, C$_3$-C$_8$ cycloalkyl, phenyl, benzyl, C$_1$-C$_4$ alkylphenyl, C$_1$-C$_4$ alkoxyphenyl, halophenyl, C$_1$-C$_4$ alkylbenzyl, C$_1$-C$_4$ alkoxybenzyl or halobenzyl, 5-, 6-, or 7-membered heterocyclic structure containing two oxygen elements;
R$^3$ represents hydrogen, linear or branched C$_1$-C$_{16}$ alkyl or C$_2$-C$_{18}$ alkoxyalkyl; or are C$_3$-C$_8$ cycloalkyl, phenyl or benzyl which are unsubstituted or substituted by C$_1$-C$_6$ alkyl; and
X is S, N or O; and
the polyanion is represented by Formula 2:

$$A_xB_yC_z \qquad \text{Formula 2}$$

wherein:
A is polystyrenesulfonic acid or salt of polystyrenesulfonate;
B and C separately represent polymerized units substituted with a group selected from:
-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$— group; and
R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{10}$ wherein:
R$^{10}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and
—(O(CHR$^{11}$CH$_2$O)$_d$—R$^{12}$ wherein:
R$^{11}$ is a hydrogen or an alkyl of 1 to 7 carbons;
d is an integer from 1 to the number sufficient to provide a molecular weight of up to 200,000 for the —CHR$^{11}$CH$_2$O— group;
R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
R$^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—(CHR$^{14}$CH$_2$O)$_e$—R$^{15}$ wherein:
R$^{14}$ is a hydrogen or an alkyl of 1 to 7 carbons;
e is an integer from 1 to the number sufficient to provide a molecular weight of up to 200,000 for the —CHR$^{14}$CH$_2$O— group; and
R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;

x, y and z, taken together are sufficient to form a polyanion with a molecular weight of at least 100 to no more than 500,000;
y/x is 0 to 100; and
z is 0 to a ratio z/x of no more than 100 wherein a portion of the dispersion is further subjected to rotor-stator high shear mixing, ultrasonic mixing, acoustic mixing, high-pressure homogenizing or high shearing homogenizing.

Yet another embodiment is provided in a process for forming an electrolytic capacitor comprising: providing an anode comprising a dielectric coated with an organometallic compound and forming a first conductive polymer layer comprises a polyanion and a conductive polymer, applying a second polymer slurry comprises a second conductive polymer and polyanion where in the polyanion is PSS copolymer.

Yet another embodiment is provided in a process for forming an electrolytic capacitor comprising: providing an anode comprising a dielectric coated with an organometallic compound and forming a first conductive polymer layer wherein the first conductive polymer layer comprises a polyanion and a conductive polymer, applying a second polymer slurry comprises a polyanion where in the second slurry comprises multimodal particles of PEDOT:Polyanion.

Yet another embodiment is provided in a process for forming an electrolytic capacitor comprising: providing an anode comprising a dielectric coated with an organometallic compound and forming a first conductive polymer layer the first conductive polymer layer comprises a polyanion and a conductive polymer, applying a second polymer slurry comprises a polyanion where in the second slurry comprises at least bimodal particle sizes of PEDOT:Polyanion where in the polyanion is PSS copolymer.

Yet another embodiment is provided in a process for forming an electrolytic capacitor comprising: providing an anode comprising a dielectric coated with an organometallic compound and forming a first conductive polymer layer is a prepolymerized polymer, applying a second polymer slurry comprises a second conductive polymer and polyanion where in the polyanion is PSS copolymer.

Yet another embodiment is provided in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the conductive polymer layer comprises an internal polymer layer and an external polymer layer and the internal polymer comprises pre-polymerized conductive polymer.

Yet another embodiment is provided in a process for forming a solid electrolyte capacitor comprising:
providing an anodized anode;
applying a layer comprising an organometallic compound on the anodized anode; and forming a pre-polymerized conductive polymer layer on the organometallic compound layer wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the conductive polymer layer comprises an internal polymer layer and an external polymer layer.

Yet another embodiment is provided in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the forming of the conductive layer comprises applying a dispersion comprising the first particles and the second particles; and
wherein a portion of the dispersion is further subjected to rotor-stator high shear mixing, ultrasonic mixing, acoustic mixing, high-pressure homogenizer or a high shearing homogenizer.

Yet another embodiment is provided in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the polyanion is represented by Formula 2:

$$A_xB_yC_z \quad \text{Formula 2}$$

wherein:
A is polystyrenesulfonic acid or salt of polystyrenesulfonate;
B and C separately represent polymerized units substituted with a group selected from:
-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$— group; and
R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{10}$ wherein:
R$^{10}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and
—(O(CHR$^{11}$CH$_2$O)$_d$—R$^{12}$ wherein:
R$^{11}$ is a hydrogen or an alkyl of 1 to 7 carbons;
d is an integer from 1 to the number sufficient to provide a molecular weight of up to 200,000 for the —CHR$^{11}$CH$_2$O— group;
R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
R$^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—(CHR$^{14}$CH$_2$O)$_e$—R$^{15}$ wherein:
R$^{14}$ is a hydrogen or an alkyl of 1 to 7 carbons;
e is an integer from 1 to the number sufficient to provide a molecular weight of up to 200,000 for the —CHR$^{14}$CH$_2$O— group; and
R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100;
wherein the first particles and second particles are in a dispersion;
wherein a first part of the dispersion is formed by high shear polymerization of a monomer solution and a second part of the dispersion is further subjected to rotor-stator high shear mixing, ultrasonic mixing, acoustic mixing, high-pressure homogenizer or a high shearing homogenizer.

Yet another embodiment is provided in a process for forming a solid electrolyte capacitor comprising:
providing an anodized anode; and
forming a conductive polymer layer on said anodized anode wherein said conductive polymer layer comprises an internal polymer layer and an external polymer layer and further comprises first particles comprising conductive polymer and polyanion and second particles comprising said conductive polymer and said polyanion wherein said first particles have an average particle diameter of at least 1 micron to no more than 10 microns and said second particles have an average particle diameter of at least 1 nm to no more than 600 nm; wherein said polyanion is represented by Formula 2:

$$A_xB_yC_z \quad \text{Formula 2}$$

wherein:
A is polystyrenesulfonic acid or salt of polystyrenesulfonate;
B and C separately represent polymerized units substituted with a group selected from:

-carboxyl groups;

—C(O)OR$^6$ wherein R$^6$ is selected from the group consisting of:

an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and —(CHR$^7$CH$_2$O)$_b$—R$^8$ wherein:

R$^7$ is selected from a hydrogen or an alkyl of 1 to 7 carbons;

b is an integer from 1 to the number sufficient to provide a molecular weight of up to 200,000 for the —CHR$^7$CH$_2$— group; and R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;

—C(O)—NHR$^9$ wherein:

R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;

—C$_6$H$_4$—R$^{10}$ wherein:

R$^{10}$ is selected from:

a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;

a reactive group selected from the group consisting of hydroxyl, carboxyl, amine, epoxy, silane, imide, amide, thiol, alkene, alkyne, phosphate, azide, acrylate, anhydride and —(O(CHR$^{11}$CH$_2$O)$_d$—R$^{12}$ wherein:

R$^{11}$ is a hydrogen or an alkyl of 1 to 7 carbons;

d is an integer from 1 to the number sufficient to provide a molecular weight of up to 200,000 for the —CHR$^{11}$CH$_2$O— group;

R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;

—C$_6$H$_4$—O—R$^{13}$ wherein:

R$^{13}$ is selected from:

a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;

a reactive group selected from the group consisting of epoxy, silane, alkene, alkyne, acrylate, phosphate and —(CHR$^{14}$CH$_2$O)$_e$—R$^{15}$ wherein:

R$^{14}$ is a hydrogen or an alkyl of 1 to 7 carbons;

e is an integer from 1 to the number sufficient to provide a molecular weight of up to 200,000 for the —CHR$^{14}$CH$_2$O— group; and R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;

x, y and z, taken together are sufficient to form a polyanion with a molecular weight of at least 100 to no more than 500,000;

y/x is 0 to 100; and z is 0 to a ratio z/x of no more than 100 wherein:

y represents 10 to 30% and z represents 0 to 20% of the sum total of x+y+z; and wherein the external polymer layer comprises the polyanion.

Yet another embodiment is provided in a capacitor comprising:

an anodized anode; and a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the conductive polymer layer comprises an internal polymer layer and an external polymer layer and the internal polymer comprises pre-polymerized conductive polymer.

Yet another embodiment is provided in a capacitor comprising:

an anodized anode;

a layer comprising an organometallic compound on the anodized anode; and a conductive polymer layer on the organometallic compound layer wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the conductive polymer layer comprises an internal polymer layer and an external polymer layer.

Yet another embodiment is provided in a capacitor comprising:

an anodized anode; and a conductive polymer layer on the anodized anode wherein the conductive polymer layer comprises an internal polymer layer and an external polymer layer and further comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm;

wherein the polyanion is represented by Formula 2:

$\qquad$ Formula 2 wherein:

A is polystyrenesulfonic acid or salt of polystyrenesulfonate;

B and C separately represent polymerized units substituted with a group selected from:

carboxyl groups;

—C(O)OR$^6$ wherein R$^6$ is selected from the group consisting of:

an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and —(CHR$^7$CH$_2$O)$_b$—R$^8$ wherein:

R$^7$ is selected from a hydrogen or an alkyl of 1 to 7 carbons;

b is an integer from 1 to the number sufficient to provide a molecular weight of up to 200,000 for the —CHR$^7$CH$_2$— group; and R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;

—C(O)—NHR$^9$ wherein:

R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;

—C$_6$H$_4$—R$^{10}$ wherein:

R$^{10}$ is selected from:

a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;

a reactive group selected from the group consisting of hydroxyl, carboxyl, amine, epoxy, silane, imide, amide, thiol, alkene, alkyne, phosphate, azide, acrylate, anhydride and —(O(CHR$^{11}$CH$_2$O)$_d$—R$^{12}$ wherein:

R$^{11}$ is a hydrogen or an alkyl of 1 to 7 carbons;

d is an integer from 1 to the number sufficient to provide a molecular weight of up to 200,000 for the —CHR$^{11}$CH$_2$O— group;

R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;

—C$_6$H$_4$—O—R$^{13}$ wherein:

R$^{13}$ is selected from:

a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;

a reactive group selected from the group consisting of epoxy, silane, alkene, alkyne, acrylate, phosphate and —(CHR$^{14}$CH$_2$O)$_e$—R$^{15}$ wherein:

R$^{14}$ is a hydrogen or an alkyl of 1 to 7 carbons;

e is an integer from 1 to the number sufficient to provide a molecular weight of up to 200,000 for the —CHR$^{14}$CH$_2$O— group; and R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;

x, y and z, taken together are sufficient to form a polyanion with a molecular weight of at least 100 to no more than 500,000;

y/x is 0 to 100; and z is 0 to a ratio z/x of no more than 100 wherein:

y represents 10 to 30% and z represents 0 to 20% of the sum total of x+y+z; and wherein the external polymer layer comprises the polyanion.

Yet another embodiment is provided in a dispersion comprising:

first particles comprising conductive polymer and polyanion wherein the first particles have an average particle diameter of at least 1 micron to no more than 10 microns;

second particles comprising the conductive polymer and the polyanion wherein the second particles have an average particle diameter of at least 1 nm to no more than 600 nm;

wherein the conductive polymer comprises conjugated groups having the structure of Formula I:

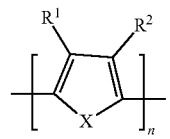

Formula 1 wherein:

R$^1$ and R$^2$ independently represent linear or branched C$_1$-C$_{16}$ alkyl or C$_2$-C$_{18}$ alkoxyalkyl; or are C$_3$-C$_8$ cycloalkyl, phenyl or benzyl which are unsubstituted or substituted by C$_1$-C$_6$ alkyl, C$_1$-C$_6$ alkoxy, halogen or OR$^3$; or R$^1$ and R$^2$, taken together, are linear C$_1$-C$_6$ alkylene which is unsubstituted or substituted by C$_1$-C$_6$ alkyl, C$_1$-C$_6$ alkoxy, halogen, C$_3$-C$_8$ cycloalkyl, phenyl, benzyl, C$_1$-C$_4$ alkylphenyl, C$_1$-C$_4$ alkoxyphenyl, halophenyl, C$_1$-C$_4$ alkylbenzyl, C$_1$-C$_4$ alkoxybenzyl or halobenzyl, 5-, 6-, or 7-membered heterocyclic structure containing two oxygen elements;

R$^3$ represents hydrogen, linear or branched C$_1$-C$_{16}$ alkyl or C$_2$-C$_{18}$ alkoxyalkyl; or are C$_3$-C$_8$ cycloalkyl, phenyl or benzyl which are unsubstituted or substituted by C$_1$-C$_6$ alkyl; and X is S, N or O; and the polyanion is represented by Formula 2:

$$A_xB_yC_z \quad \text{Formula 2}$$

wherein:

A is polystyrenesulfonic acid or salt of polystyrenesulfonate;

B and C separately represent polymerized units substituted with a group selected from:

-carboxyl groups;

—C(O)OR$^6$ wherein R$^6$ is selected from the group consisting of:

an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and —(CHR$^7$CH$_2$O)$_b$—R$^8$ wherein:

R$^7$ is selected from a hydrogen or an alkyl of 1 to 7 carbons;

b is an integer from 1 to the number sufficient to provide a molecular weight of up to 200,000 for the —CHR$^7$CH$_2$— group; and R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;

—C(O)—NHR$^9$ wherein:

R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;

—C$_6$H$_4$—R$^{10}$ wherein:

R$^{10}$ is selected from:

a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;

a reactive group selected from the group consisting of hydroxyl, carboxyl, amine, epoxy, silane, imide, amide, thiol, alkene, alkyne, phosphate, azide, acrylate, anhydride and —(O(CHR$^{11}$CH$_2$O)$_d$—R$^{12}$ wherein:

R$^{11}$ is a hydrogen or an alkyl of 1 to 7 carbons;

d is an integer from 1 to the number sufficient to provide a molecular weight of up to 200,000 for the —CHR$^{11}$CH$_2$O— group;

R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;

—C$_6$H$_4$—O—R$^{13}$ wherein:

R$^{13}$ is selected from:

a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;

a reactive group selected from the group consisting of epoxy, silane, alkene, alkyne, acrylate, phosphate and —(CHR$^{14}$CH$_2$O)$_e$—R$^{15}$ wherein:

R$^{14}$ is a hydrogen or an alkyl of 1 to 7 carbons;

e is an integer from 1 to the number sufficient to provide a molecular weight of up to 200,000 for the —CHR$^{14}$CH$_2$O— group; and R$^{15}$ is selected from hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;

x, y and z, taken together are sufficient to form a polyanion with a molecular weight of at least 100 to no more than 500,000;

y/x is 0 to 100; and z is 0 to a ratio z/x of no more than 100 wherein a portion of the dispersion is further subjected to rotor-stator high shear mixing, ultrasonic mixing, acoustic mixing, high-pressure homogenizing or high shearing homogenizing.

Yet another embodiment is provided in a capacitor comprising an anode foil; and a conductive polymer layer on the anode foil. The conductive polymer layer comprises first particles comprising conductive polymer and polyanion and second particles comprising the conductive polymer and the polyanion wherein the first particles have an average particle diameter of at least 1 micron to no more than 10 microns. The second particles have an average particle diameter of at least 1 nm to no more than 600 nm. The conductive polymer layer comprises an internal polymer layer and an external polymer layer and the internal polymer comprises pre-polymerized conductive polymer.

Yet another embodiment is provided in a capacitor comprising an anodized anode wherein the anodized anode is selected from a monolith and a foil. A conductive polymer layer is on the anodized anode wherein the conductive polymer layer comprises an internal polymer layer and an external polymer layer and further comprises first particles comprising conductive polymer and polyanion and second particles comprising the conductive polymer. The polyanion wherein the first particles have an average particle diameter of at least 1 micron to no more than 10 microns and the second particles have an average particle diameter of at least 1 nm to no more than 600 nm. The polyanion is represented by Formula 2:

$$A_xB_yC_z \qquad \text{Formula 2}$$

wherein:

A is polystyrenesulfonic acid or salt of polystyrenesulfonate;

B and C separately represent polymerized units substituted with a group selected from:

-carboxyl groups;

—C(O)OR$^6$ wherein R$^6$ is selected from the group consisting of:

an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and —(CHR$^7$CH$_2$O)$_b$—R$^8$ wherein:

R$^7$ is selected from a hydrogen or an alkyl of 1 to 7 carbons;

b is an integer from 1 to the number sufficient to provide a molecular weight of up to 200,000 for the —CHR$^7$CH$_2$— group; and R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;

—C(O)—NHR$^9$ wherein:

R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;

—C$_6$H$_4$—R$^{10}$ wherein:

R$^{10}$ is selected from:

a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;

a reactive group selected from the group consisting of hydroxyl, carboxyl, amine, epoxy, silane, imide, amide, thiol, alkene, alkyne, phosphate, azide, acrylate, anhydride and —(O(CHR$^{11}$CH$_2$O)$_d$—R$^{12}$ wherein:

R$^{11}$ is a hydrogen or an alkyl of 1 to 7 carbons;

d is an integer from 1 to the number sufficient to provide a molecular weight of up to 200,000 for the —CHR$^{11}$CH$_2$O— group;

R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;

—C$_6$H$_4$—O—R$^{13}$ wherein:

R$^{13}$ is selected from:

a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;

a reactive group selected from the group consisting of epoxy, silane, alkene, alkyne, acrylate, phosphate and —(CHR$^{14}$CH$_2$O)$_e$—R$^{15}$ wherein:

R$^{14}$ is a hydrogen or an alkyl of 1 to 7 carbons;

e is an integer from 1 to the number sufficient to provide a molecular weight of up to 200,000 for the —CHR$^{14}$CH$_2$O— group; and $R^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;

x, y and z, taken together are sufficient to form a polyanion with a molecular weight of at least 100 to no more than 500,000;

y/x is 0 to 100; and z is 0 to a ratio z/x of no more than 100 wherein:

y represents 10 to 30% and z represents 0 to 20% of the sum total of x+y+z; and wherein said external polymer layer comprises said polyanion.

DETAILED DESCRIPTION OF THE INVENTION

Figure 1:
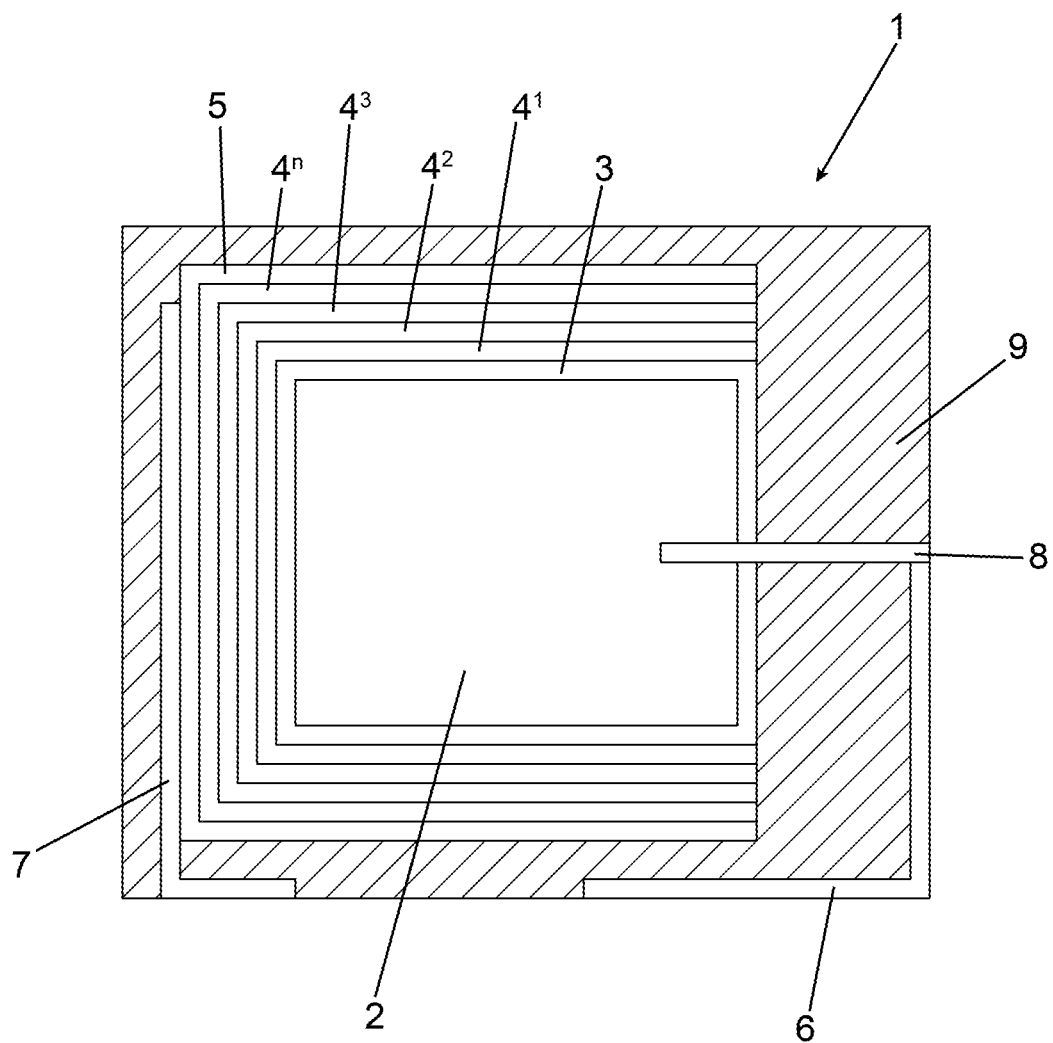
FIG. 1 is a schematic cross-sectional view of a solid electrolytic capacitor.

The present invention is related to an improved conductive polymer dispersion for use in solid electrolyte capacitors, an improved solid electrolyte capacitor comprising the conductive polymer as a cathode, a slurry comprising the conductive polymer, and a method for making the improved solid electrolyte capacitor. More particularly, the present invention is related to an improved polymerization method for conductive polymer dispersions suitable for use in an improved solid electrolyte capacitor wherein the improvement arises, at least in part, by improved corner and edge coverage on the anodized anode and improved interfacial adhesion in cathode layers.

It has been found that, surprisingly, complete corner and edge coverage and improved interfacial adhesion in a solid electrolyte capacitor can be achieved by applying a mixture comprising a dispersion of conductive polymer with at least a bimodal size distribution of a conductive polymer:polyanion complex particles in a solvent. The first particles have a median particle size ($D_{50}$) which is at least 1 micron to no more than 10 microns. More preferably, the first particles have a $D_{50}$ which is at least 1 micron to no more than 5 microns and even more preferably at least 2 microns to no more than 4 microns. The second particles have a $D_{50}$ of at least 1 nm to no more than 600 nm more preferably at least 100 nm to no more than 500 nm and even more preferably at least 200 nm to no more than 400 nm. The term average diameter, reported as $D_{50}$, is the mass-median diameter or average particle diameter by mass. While being described as bi-modal dispersion having more than two distinct particle sizes are contemplated.

It is preferred that the particles of polymer and anion have at least 5 wt % to no more than 95 wt % first particles with a $d_{50}$ of at least 1 micron to no more than 10 microns, more preferably at least 25 wt % to no more than 75 wt % and even more preferably at least 40 wt % to no more than 60 wt %. It is also preferred that the particles of polymer and anion have at least 5 wt % to no more than 95 wt % second particles with a $D_{50}$ of at least 1 nm to no more than 600 nm, more preferably at least 25 wt % to no more than 75 wt % and even more preferably at least 40 wt % to no more than 60 wt %.

It has been found, surprisingly, the ratio adjustment of first particles and second particles in conducting polymer dispersion through post processing a part of dispersion impact polymer film quality. The post processing techniques can be high shear mixing, ultrasonic mixing, acoustic mixing, high-pressure homogenizing or high shearing homogenizing mixing. The at least bimodal size distribution of conductive polymer:polyanion particles leads to significantly improved corner and edge coverage compared to prior art dispersions with monomodal particle size distribution. The result is a solid electrolytic capacitor with significantly improved ESR and improved leakage reliability in humid conditions. The present invention provides for a solid electrolytic capacitor with an ESR shift of less than 100% and a leakage of less than 0.1 CV after 1000 hrs load at 85° C. and 85% relative humidity.

In a particularly preferred embodiment the internal polymer layer comprises smaller particles and the external polymer layer comprises an at least bimodal size distribution of conductive polymer:polyanion particles.

The invention will be described with reference to the figures forming an integral, non-limiting element of the disclosure.

A capacitor of the invention will be described with reference to FIG. 1 wherein a solid electrolytic capacitor is illustrated in cross-sectional schematic view. In FIG. 1, the solid electrolytic capacitor, 1, comprises a monolithic anode, 2, with a dielectric, 3, thereon. Monolithic anodes are formed by pressing a powder into a monolith followed by sintering and oxidation of the pressed powder. After completion the conductive polymeric layer, 4, is essentially a continuous, preferably un-striated layer, formed by multiple process steps and will therefore be described herein with each layer discussed separately for the purposes of illustration and clarity. It is well known that attaching a lead to a conductive polymer layer is difficult and it is therefore standard in the art to apply an attachment layer, 5, typically comprising layers containing conductive carbon on the conductive polymer layer and silver containing layers on the carbon containing layer. A cathode lead, 7, is attached to the attachment layer by a conductive adhesive. An anode lead, 6, is attached to a lead wire, 8, typically by welding and the entire assembly, except for portions of the cathode lead and anode lead, are encapsulated in a non-conductive material, 9, such as a resin.

The first conductive polymer layer, $4^1$, applied is referred to as an internal polymer layer and is formed in a manner sufficient to allow the interstitial areas of the porous dielectric to be adequately coated. The first conductive polymer layer typically comprises sublayers which are formed sequentially preferably from common components and under common conditions suitable to coat the interstitial areas of the porous dielectric. The first conductive polymer layer typically comprises 1 to 5 layers with each containing a conjugated conductive polymer.

The first conductive polymer layer can have the same conductive polymer and polyanion as subsequent layers, however, the first conductive polymer layer is preferably formed by at least one application of a conductive polymer formed by in-situ polymerization formed from solutions of monomer(s), oxidant and dopant(s) or by at least one application of a conductive polymer solution or dispersion having small average particle sizes thereby allowing for adequate penetration. In one embodiment the internal polymer layer is formed from a dispersion comprising particles of conductive polymer and polyanion wherein the particle size a $D_{50}$ of 10 to 50 nm. More preferably the internal polymer has particle size with a $D_{50}$ of 10 to 30 nm and more preferably 10-20 nm. In one embodiment the internal polymer layer is free of in-situ polymerized conducting polymer.

The internal polymer layer may further coated on adhesion promoting layer to improve adhesion between dielectric and conducting polymer layer. The examples of adhesion promoter such as organometallic compounds or organofunctional silanes or hydrolyzates or organofunctional silanes containing weak acid, phosphates thereof, e.g. 3-glycidoxy-propyl-trialkoxysilane, 3-aminopropyltriethoxysilane, 3-mercaptopropyltrimethoxysilane, 3-methacryloyloxy-propyltrimethoxysilane; vinyltrichlorosilane, vinyl(β-methoxysilane), vinyltriethoxysilane, γ-methacryloxysilane, β-(3,4-epoxycyclohexyl)ethyltrimethoxysilane, γ-glycidoxypropyltrimethoxysilane, N-β-(aminoethyl)-γ-aminopropylmethyldimethoxysilane, N-β-(aminoethyl)-γ-aminopropyltrimethoxysilane, γ-aminopropyltriethoxysilane, N-phenyl-γ-aminopropyltrimethoxysilane, γ-mercaptopropyltrimethoxysilane, γ-chloropropyltrimethoxysilane, or the like. or water soluble monomers/oligomers/polymers containing reactive groups such as acid, alcohol, phenol, amines, epoxy, acrylates etc. Example of The weak acid in organofunctional silanes can be acetic acid, phosphoric acid, or the like. The internal polymer layer may further comprise small molecular or polymeric counterions including the polyanion described elsewhere herein. In one embodiment the organometallic compound is applied to the dielectric, or the surface of the anodized anode, and the internal polymer layer is formed thereon. In another embodiment the organometallic compound is applied between layers of conductive polymer.

Subsequent conductive polymer sub-layers, $4^2$-$4^n$, wherein n is up to about 10, are referred to collectively as the external polymer layer, typically applied in the form of a dispersion or solution, wherein the conductive polymer containing dispersion or solution used to form each sublayer may be the same or different thereby resulting in layers which are compositionally the same or different with a preference for commonality for manufacturing convenience. At least one external layer comprises the inventive polymer dispersion and preferably each of the external layers comprises the inventive polymer dispersion. In one embodiment the external layers are free of in-situ polymerized conducting polymer.

The external layers may also independently comprise surface-active substances, for example ionic and/or nonionic surfactants; adhesion promoters, for example organofunctional silanes or hydrolyzates, phosphates thereof, e.g. 3-glycidoxypropyl-trialkoxysilane, 3-aminopropyltriethoxysilane, 3-mercaptopropyltrimethoxysilane, 3-methacryloyloxy-propyltrimethoxysilane, vinyltrimethoxysilane or octyltriethoxysilane, polyurethanes, polyacrylates or polyolefin dispersions, or further additives.

The external layers may further independently comprise additives which enhance the conductivity, for example compounds containing ether groups, for example tetrahydrofuran; compounds containing lactone groups, such as γ-butyrolactone, valerolactone; compounds containing amide or lactam groups, such as caprolactam, N-methylcaprolactam, N,N-dimethylacetamide, N-methyl-acetamide, N,N-dimethylformamide (DMF), N-methyl-formamide, N-methylformanilide, N-methylpyrrolidone (NMP), N-octylpyrrolidone, pyrrolidone; sulfones and sulfoxides, for example sulfolane (tetramethylenesulfone), dimethyl sulfoxide (DMSO); sugars or sugar derivatives, for example sucrose, glucose, fructose, lactose, sugar alcohols, for example sorbitol, mannitol; imides, for example succinimide or maleimide; furan derivatives, for example 2-furancarboxylic acid, 3-furancarboxylic acid, and/or di- or polyalcohols, for example ethylene glycol, glycerol or di- or triethylene glycol. Preference is given to using, as conductivity-enhancing additives, ethylene glycol, dimethyl sulfoxide, glycerol or sorbitol.

The external polymer layers may have a primer or cross liker layer between adjacent conductive polymer sub-layers to improve inter-layer adhesion. In a preferred embodiment conductive polymer sub-layers $4^2$-$4^n$ are deposited primer or cross-linker without a primer there between. The examples of primer compound are mono amine or diamime compounds such as comprising at least amine groups and, in one embodiment, preferably at least 2 amine groups. Diamines which are particularly suitable amines are listed in U.S. Pat. No. 8,882,856, which is incorporated herein by reference. Specifically preferred amines include crosslinkers which comprise at least one diamine, triamine, oligoamine or polymeric amine or derivatives thereof including the following amines: aliphatic amines, particularly aliphatic .alpha.,.OMEGA.-diamines such as 1,4-diaminocyclohexane or 1,4-bis(amino-methyl)cyclohexane; linear aliphatic .alpha.,.OMEGA.-diamines such as ethylenediamine, 1,6-hexanediamine, 1,7-heptanediamine, 1,8-octanediamine, 1,9-nonanediamine, 1,10-decanediamine or 1,12-dodecanediamine; derivatives of aliphatic .alpha.,.OMEGA.-diamines such as N,N-dimethylethylenediamine, N,N,N',N'-tetramethylethylenediamine, N,N,N',N'-tetramethyl-1,4-butanediamine, N,N,N,N',N',N'-hexamethylhexamethylene-diammonium dibromide, piperazine, 1,4-diazabicyclo[2.2.2]octane, N,N,N',N'-tetrakis(2-hydroxypropyl)ethylenediamine, N-[3-(trimethoxysilyl)propyl]ethylenediamine, or 1,4-bis(3-aminopropyl)piperazine; amides such as N,N'-diacetyl-1,6-hexanediamine, N,N,N',N'-tetraacetylethylene-diamine, 1,4-diformylpiperazines or N,N'-ethylenebis(stearamide); aliphatic amines having at least three amino groups such as 1,4-bis(3-aminopropyl)piperazine; linear aliphatic amines having at least three amino groups such as N-(6-aminohexyl)-1,6-diaminohexane or N-(3-aminopropyl)-1,4-diaminobutane; derivatives of linear aliphatic amines having at least three amino groups such as 3-[2-(2-aminoethylamino) ethylamino]propyltrimethoxysilane; aromatic amines having at least two amino groups, organofunctional silane containing amino groups such as 3-aminopropyltriethoxysilane. The prime compound may further comprises strong or weak acid as counter ion such as p-toluenesulfonic acid, acetic acid, phosphoric acid.

Figure 3:
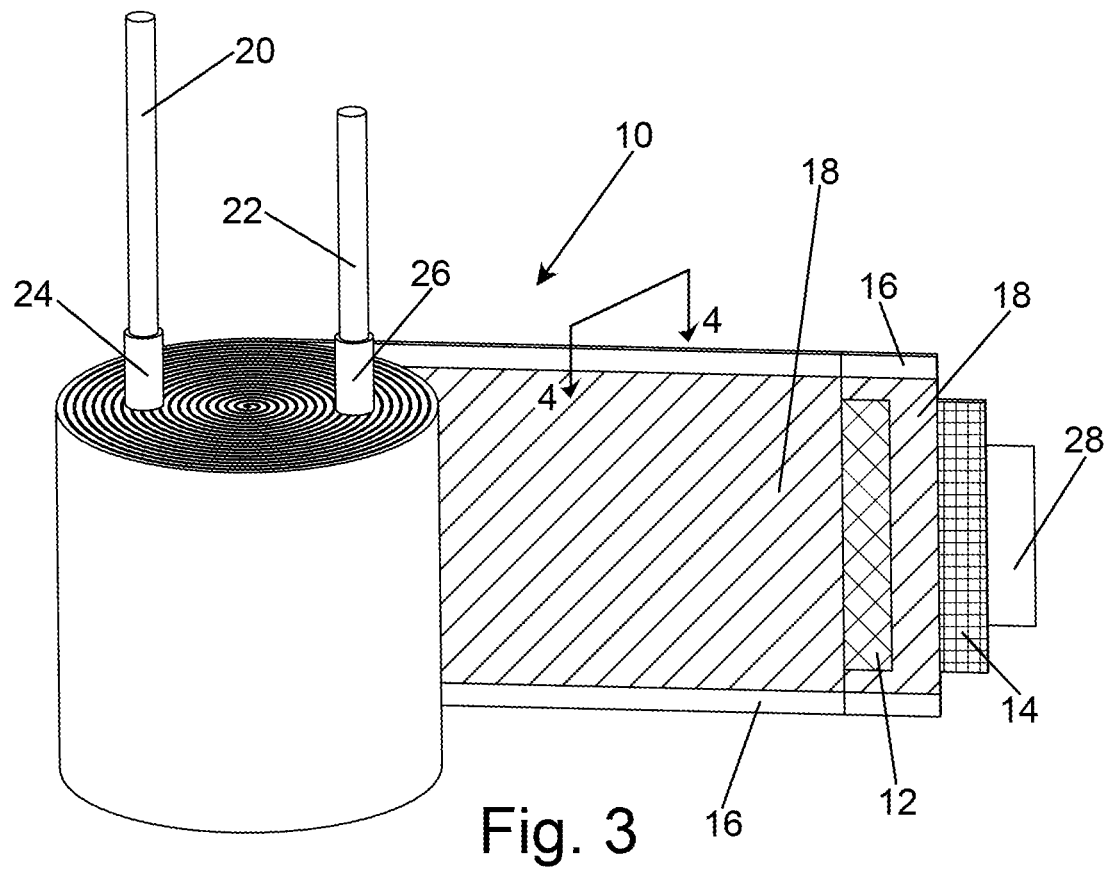
FIG. 3 is a partially unwound schematic perspective view of an embodiment of the invention.

An embodiment of the invention will be described with reference to FIG. 3 wherein a working element of a wound hybrid capacitor is shown in schematic partially unwound view prior to insertion into a container and impregnation with impregnating electrolyte wherein the impregnating electrolyte is preferable a liquid electrolyte or a gel electrolyte. In FIG. 3, the working element, generally represented at 10, comprises a conductive coated anode, 12, comprising conductive polymer on at least a portion of one side, and conductive coated cathode, 14, with a separator, 16, there between. The separator is preferably a conductive separator. A conductive separator has conductive polymer, 18, either coated on the separator or the separator is impregnated, and preferably saturated, with conductive polymer. The conductive coated anode, 12, and conductive coated cathode, 14, each have conductive polymer layers there on as will be more full described herein. An anode lead, 20, and cathode lead, 22, extend from the wound capacitor and ultimately form the electrical connectivity to a circuit. It would be understood from the description that the anode lead is in electrical contact with the anode and the cathode lead is in electrical contact with the cathode and electrically isolated from the anode or anode lead. Tabs, 24 and 26, are commonly employed to electrically connect the anode lead to the anode and the cathode lead to the cathode as known in the art. A closure, 28, such as an adhesive tape inhibits the working element from unwinding during handling and assembly after which the closure has little duty even though it is part of the finished capacitor.

Figure 4:
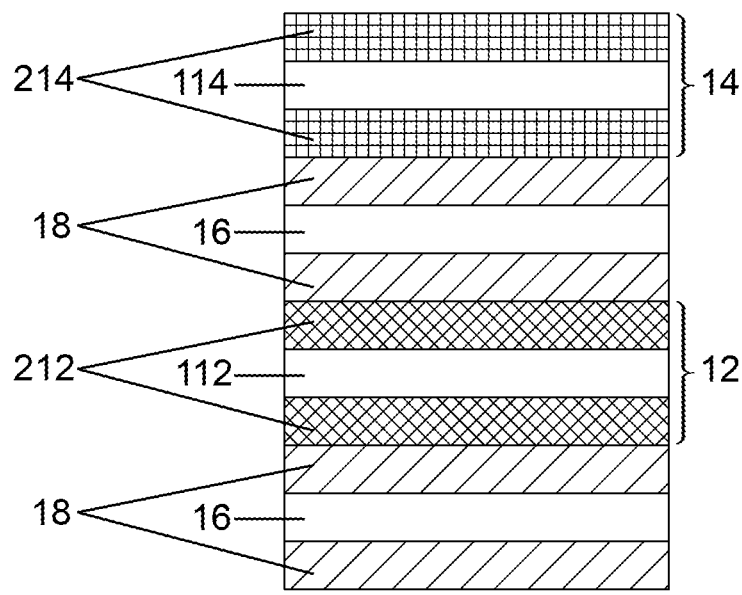
FIG. 4 is a cross-sectional view taken along line 4-4 of FIG. 3.

A cross-sectional view, taken along line 4-4 of FIG. 3, is illustrated schematically in FIG. 4. In FIG. 4, the separator, 16, is shown with conductive polymer, 18, on either side thereof for the purposes of illustration with the understanding that the separator may be impregnated, and preferably saturated, with conductive polymer such that the dimension of the separator is not appreciably altered by the inclusion of conductive polymer. The conductive polymer layer, 18, is preferably crosslinked and in a particularly preferred embodiment the conductive polymer layer, 18, is crosslinked to the separator, 16. The conductive coated anode, 12, illustrated as a symmetrical anode comprises an anode foil, 112, with an anode conductive layer, 212, on each side thereof when the preferred conductive layer is a conductive polymer layer. The conductive polymer layer, 212, is preferably crosslinked and in an embodiment the conductive polymer layer, 212, is crosslinked to adjacent conductive polymer layer, 18. The conductive coated cathode, 14, comprises a cathode foil, 114, with a conductive layer, 214, on at least one side thereof. The conductive layer, 214, on the cathode is preferably a conductive polymer layer may be crosslinked to an adjacent conductive polymer layer, 18. Alternatively, the conductive layer, 214, on the cathode is a carbon layer. The separator is preferably porous thereby allowing impregnating electrolyte to pass there through. Once the working element is formed and inserted into a housing the impregnating electrolyte fills any void or vacancy between the anodes conductive polymer layer, 212, and the cathodes conductive polymer layer, 214.

The cathode is illustrated herein as having a conductive polymer coating without limit thereto. The cathode layer can comprise a conductive carbon layer or a metallic layer and in some embodiments it is preferred that the cathode not comprise a conductive polymer layer. In a preferred embodiment the cathode layer and anode layer are the same for manufacturing conveniences.

Figure 5:
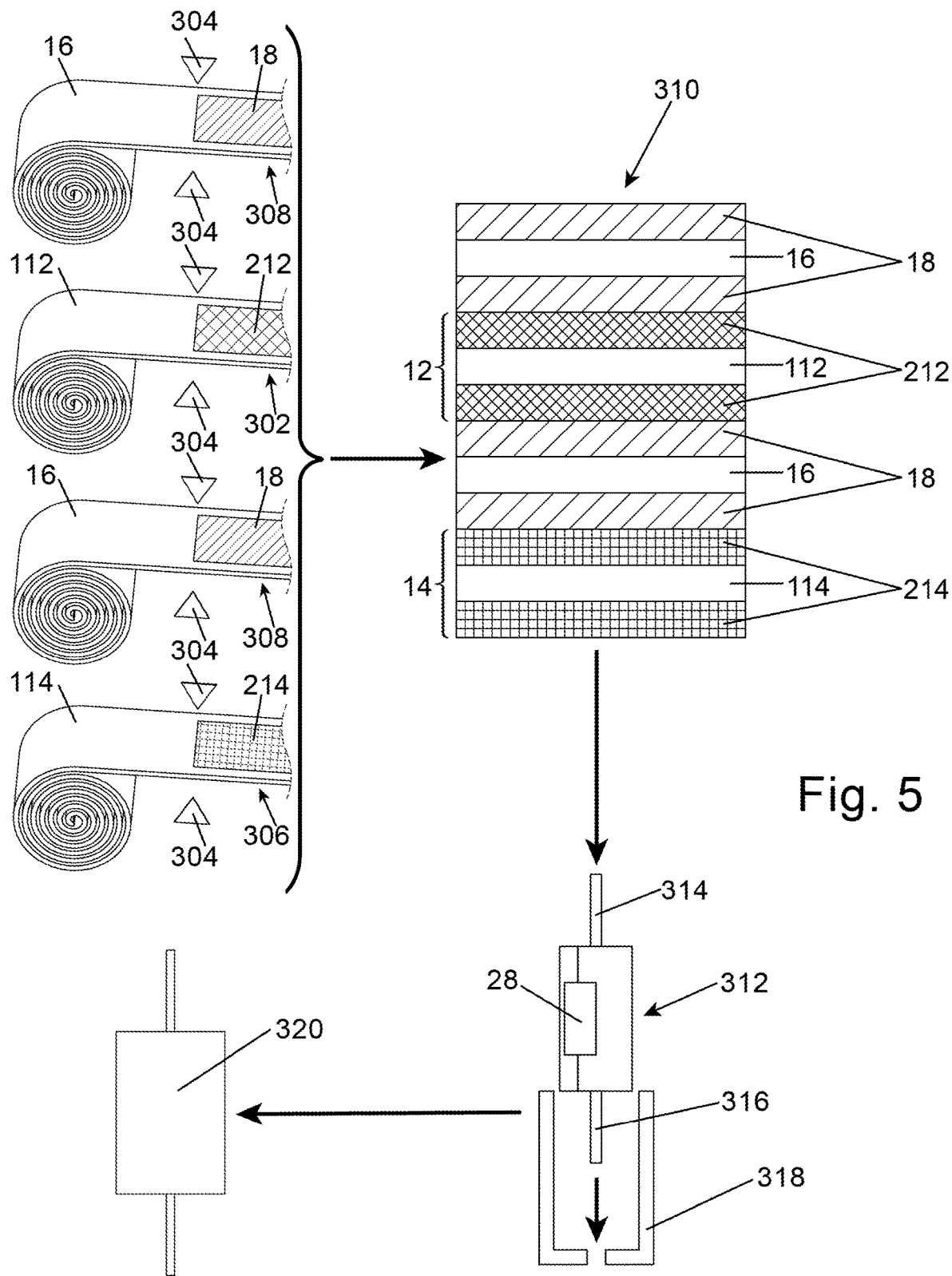
FIG. 5 is a schematic representation of an embodiment of the invention.

An embodiment of the invention will be described with reference to FIG. 5. In FIG. 5, a series of layers are prepared including an anode layer, at 302, wherein an anode foil, 112, is treated to form a dielectric on the surface of the anode foil and then preferably a conductive polymer layer, 212, is formed on the dielectric on at least a portion of one side by a conductive polymer application process, 304. The conductive polymer application process occurs on the dielectric on at least a portion of one side of the anode foil and for a symmetrical anode on both sides of the anode foil, in simultaneous or sequential coating steps. The conductive polymer layer, 212, on the anode may be crosslinked during the application process or a crosslinker may be in included which later crosslinks with the conductive polymer layer, 212, or with an adjacent layer after winding. If a cathode comprising a conductive polymer layer is employed the cathode layer is formed, at 306, wherein a conductive polymer layer, 214, is formed on the cathode, 114, by a conductive polymer application process, 304, which may be the same process as used for the anode conductive polymer layer or a different process. The conductive polymer layer, 214, on the cathode may be crosslinked during the application process or a crosslinker may be in included which later crosslinks the conductive polymer layer, 214, or with an adjacent layer after winding. If a cathode layer is used which does not comprise a conductive polymer an appropriate roll of material is provided and the polymer formation process for the cathode layer is not necessary. A separator layer is formed, at 306, wherein an impregnated area of conductive polymer, 18, is formed by a conductive polymer application process, 304, which may be the same process as the anode and cathode layer formation or a different process. The conductive polymer layer, 18, on the separator may be crosslinked during the application process or a crosslinker may be included which later crosslinks with the conductive polymer layer, 18, or with an adjacent layer after winding. A layered structure, 310, as described relative to FIG. 4, is formed by interleaving the layers. The layered structure is slit, an anode tab, 314, is electrically connected to the anode and a cathode tab, 316, is electrically connected to the cathode resulting in a tabbed working element, 312, preferably with a closure, 28, securing the working element to inhibit unwinding. Leads, not shown, are preferably attached to the tab, or the tab functions as a lead, or electrically connects to a component of a housing such as a conductive, preferably metallic, can or conductive, preferably metallic, lid which functions as a lead, thereby providing a leaded working element. For the purposes of this illustration an axial arrangement is illustrated without limit thereto. The leaded working element is placed in a housing, 318, thereby forming a housed leaded working element. The housed leaded working element is optionally impregnated with impregnating electrolyte which is preferably a liquid or a gel at operating temperatures. The housed leaded working element is optionally impregnated with crosslinker to crosslink conductive polymer layers or to crosslink adjacent conductive polymer layers to each other. The housing is sealed and the capacitor is aged to provide a finished capacitor, 320.

Figure 6:
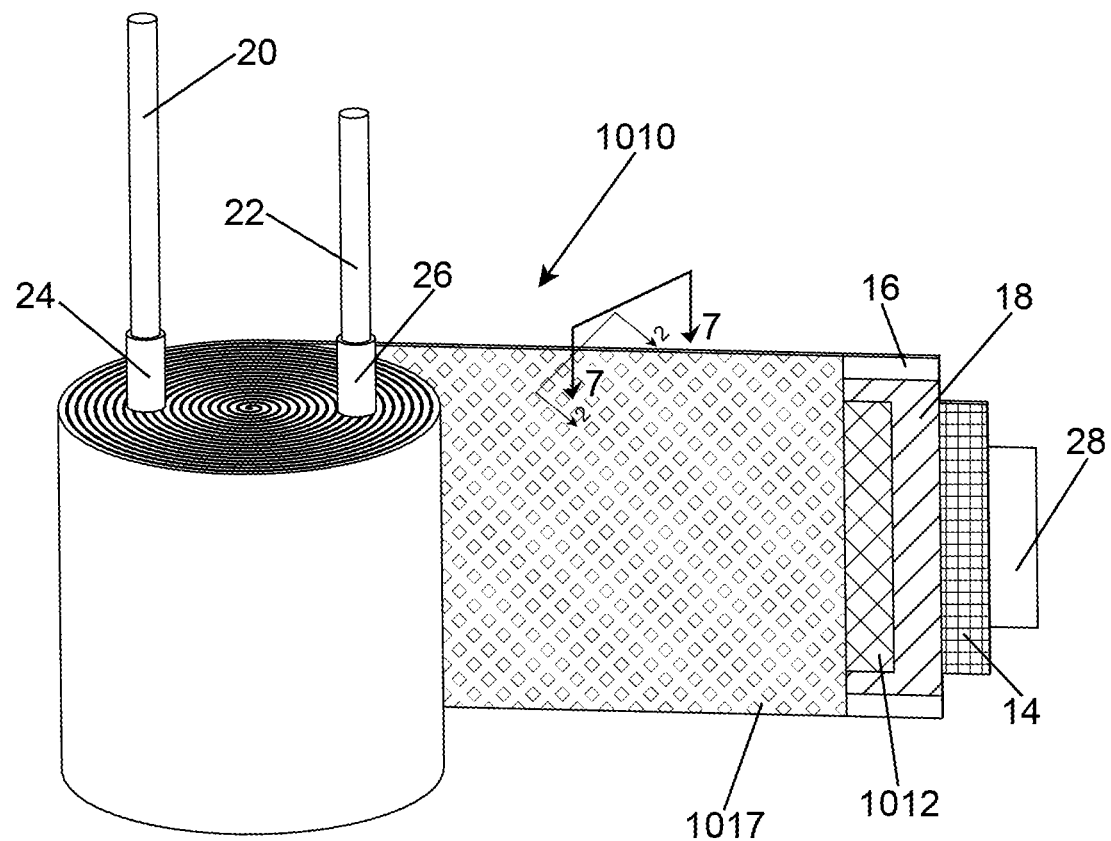
FIG. 6 is a partially unwound schematic perspective view of an embodiment of the invention.
Figure 7:
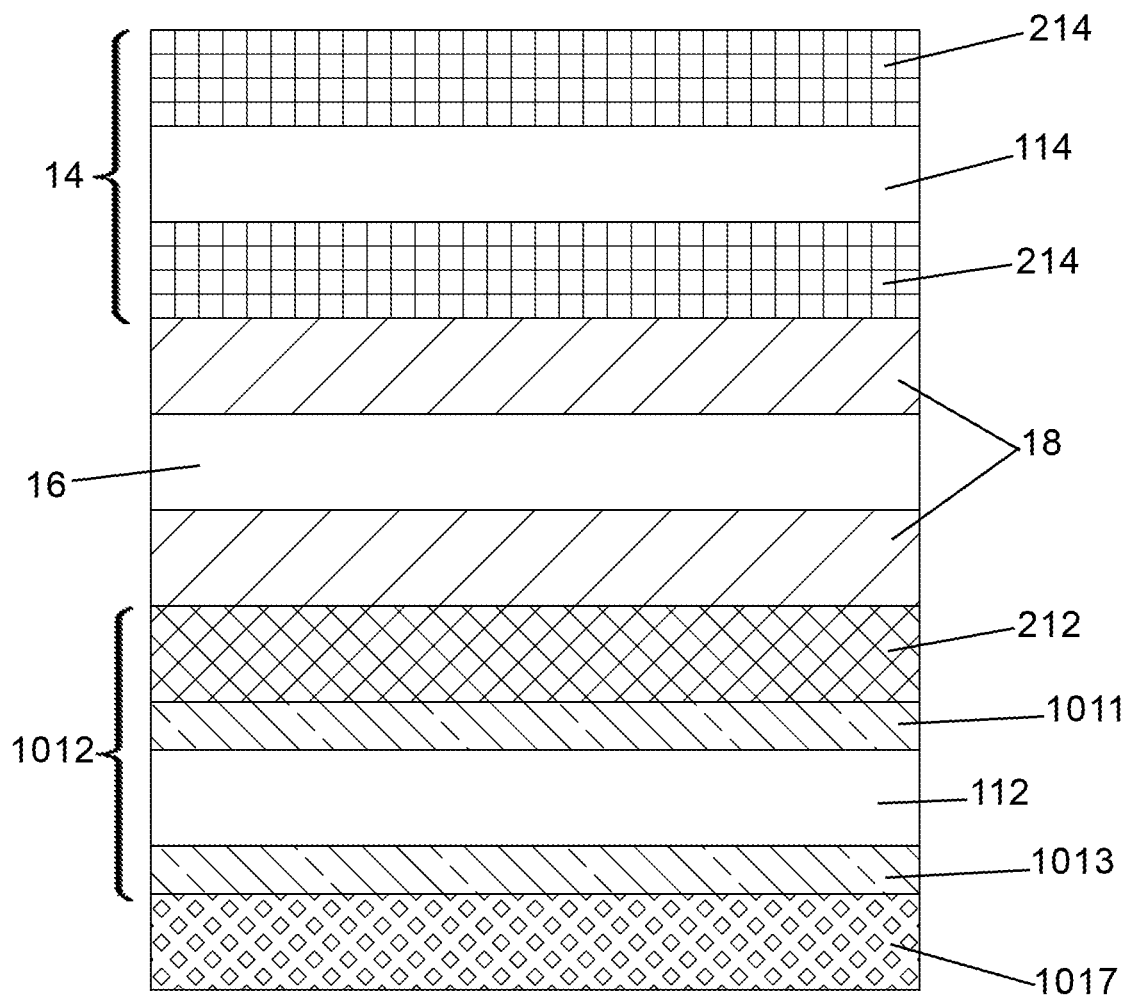
FIG. 7 is a cross-sectional view taken along line 7-7 of FIG. 6.

An embodiment of the invention will be described with reference to FIGS. 6 and 7. In FIG. 6 a working element is shown in schematic partial unwound view and in FIG. 7 a schematic cross-section is shown as taken alone line 7-7 in FIG. 6. The working element, generally represented at 1010, comprises an asymmetrical anode layer, 1012, wherein the anode layer comprises a first dielectric, 1011, on a first side and a second dielectric, 1013, on a second side. The first and second dielectric are preferably the same in some embodiments, for manufacturing conveniences, however, the first and second dielectric can be different to obtain different properties. The first dielectric is coated, and at least partially covered, with conductive polymer, 212, which is optionally crosslinked and optionally crosslinked to an adjacent conductive polymer layer. The conductive cathode layer, 14, and conductive separator can be as described with reference to FIG. 3. A non-conductive separator, 1017, is between the second dielectric and adjacent cathode layer. The non-conductive separator may be void of any conductive polymer thereon or therein. In an embodiment a conductive separator as described elsewhere herein can be utilized adjacent the second dielectric thereby minimizing the number of components necessary in the manufacturing process, however, this is not a preferred embodiment due to cost considerations.

Figure 8:
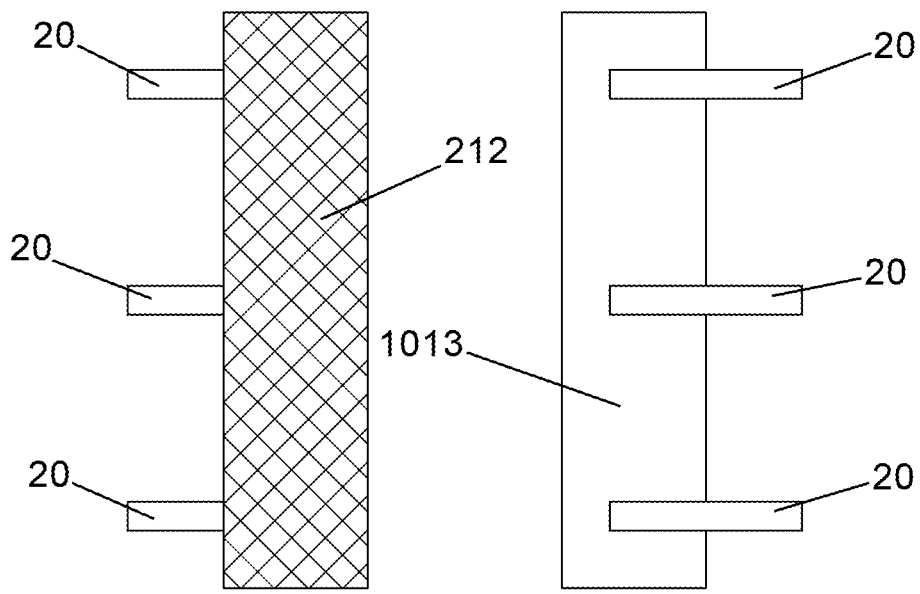
FIGS. 8 and 11 schematically illustrate opposite sides of an asymmetrical anode of the invention.

An embodiment of an asymmetrical anode layer, 1012, is illustrated in schematic view in FIG. 8 wherein the entire second dielectric, which is preferably on the same side as the attachment of the anode lead, 20, is exposed without conductive polymer layer thereon. In an embodiment the asymmetrical anode layer forms, on one side, a capacitive couple comprising conductive polymer between the dielectric of the anode and the cathode layer. The opposite side, comprising the second dielectric which does not comprise polymer, has impregnating electrolyte and a non-conductive separator between the second dielectric and cathode thereby forming a conventional capacitive couple utilizing a impregnating electrolyte thereby forming a capacitor comprising parallel functionality.

For the purposes of the present invention an asymmetrical anode is defined as an anode having less of the surface area on one side coated by conductive polymer than the amount of surface area on the opposite side coated by conductive polymer.

Figure 9:
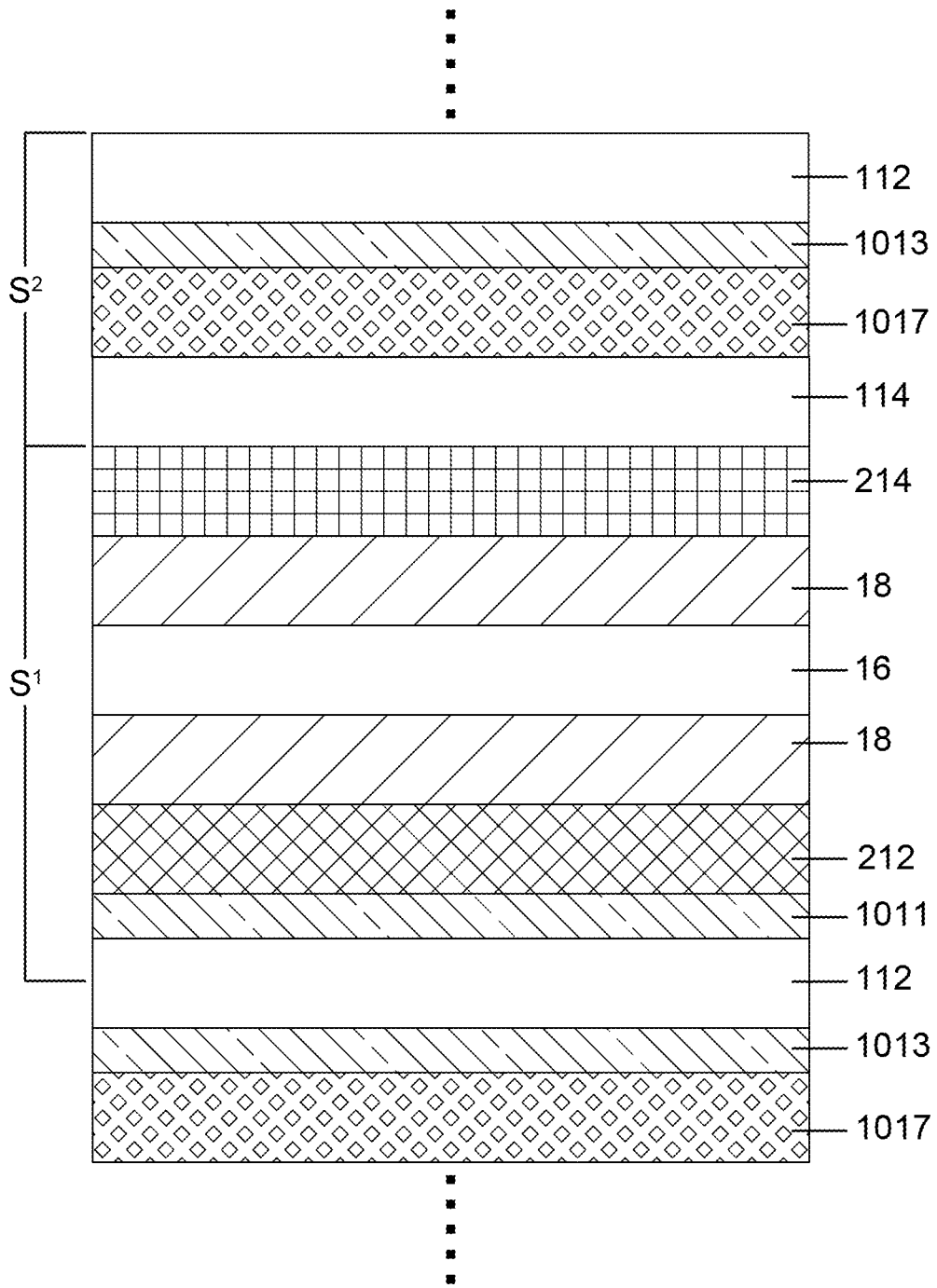
FIG. 9 is a schematic cross-sectional view of an embodiment of the invention.
Figure 10:
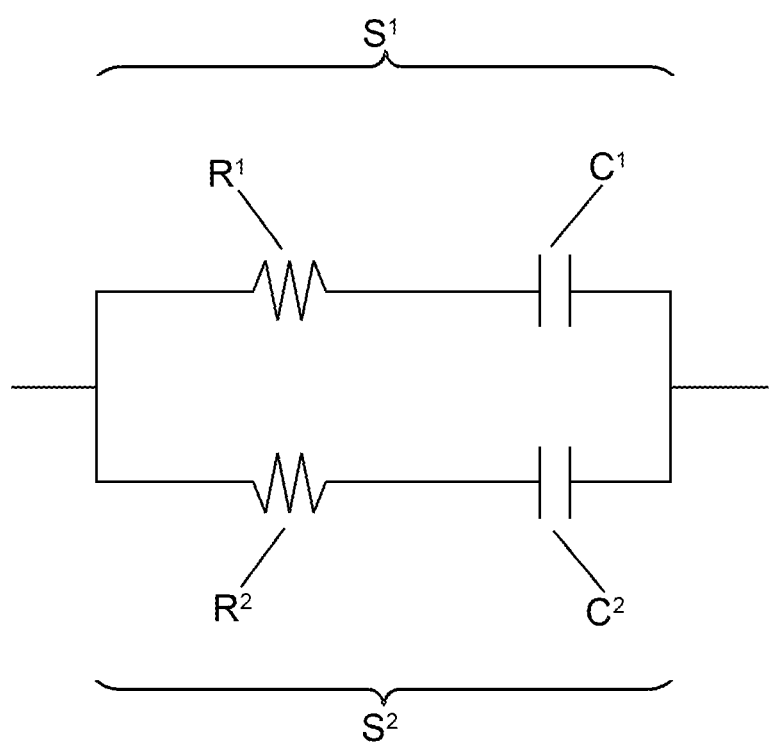
FIG. 10 is an electrical schematic diagram of an embodiment of the invention.

An embodiment of an asymmetrical capacitor comprising an asymmetrical anode is illustrated schematically in FIG. 9. In FIG. 9, an anode, 112, is illustrated schematically comprising a first dielectric, 1011 and second dielectric, 1013. The first dielectric has coated thereon a layer of conductive polymer, 212. A conductive separator, 16, comprising conductive polymer, 18, as detailed herein is adjacent the conductive polymer layer, 212. A cathode layer, 114, with an optional first layer of conductive polymer, 214, is adjacent the conductive separator thereby forming a first circuit, $S^1$, having a first resistance and first capacitance. The second dielectric, 1013, of the anode is separated from the cathode by a non-conductive insulator, 1017, thereby forming a second circuit, $S^2$, having a second resistant and second capacitance. The capacitor illustrated in FIG. 9 would have an electrical schematic diagram is illustrated in FIG. 10 wherein the resistance and capacitance of the first capacitive couple, comprising a conductive polymer there between, illustrated as $S^1$, has a first resistance, $R^1$, and a first capacitance, $C^1$. The second capacitive couple, with no conductive polymer there between, illustrated as $S^2$, has a second resistance, $R^2$, and a second capacitance, $C^2$. In FIG. 9 at least one conductive polymer layer may be crosslinked and preferably with an adjacent conductive polymer layer. In an embodiment of FIG. 9 the conductive polymer, 18, on the separator, 16, is crosslinked to the separator.

A hybrid capacitor with a symmetrical anode has single capacitance with each capacitive couple having an anode and cathode with the combination of a conductive polymer and liquid dielectric there between. With an asymmetrical anode, as illustrated in FIG. 9, the total capacitance of the capacitor is represented by two parallel capacitive couples with one being the same capacitive couple as the symmetrical anode and the other being the capacitive couple formed by an anode, cathode and a non-conductive separator impregnated with a impregnating electrolyte, without a full layer, and preferably no layer, of conductive polymer there between. Each capacitive couple, with the asymmetrical anode, has two ESR's with one being the ESR for the capacitive couple having the conductive polymer between the anode and cathode, referred to herein as the polymeric capacitive couple, and the other having less than a complete layer of, or no, conductive polymer between the anode and cathode referred to as the electrolytic capacitive couple.

Figure 11:
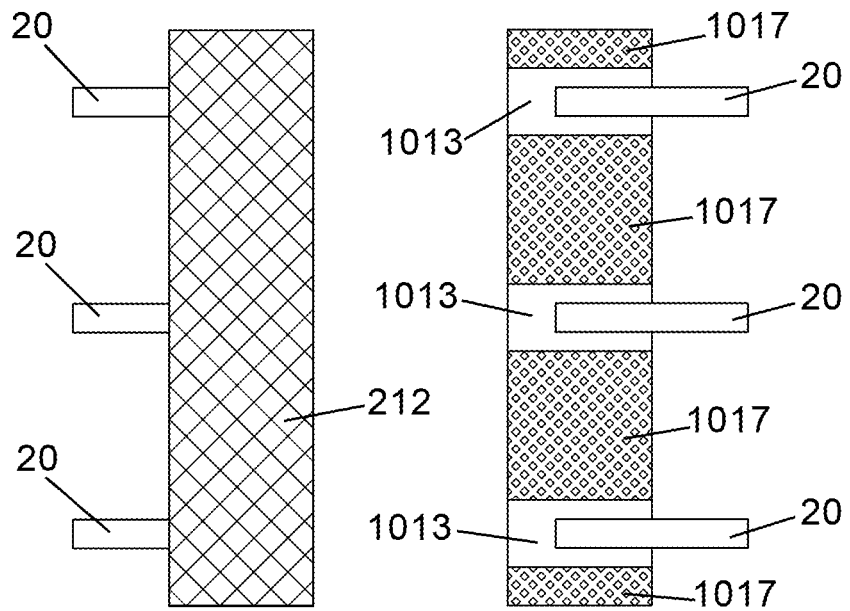
Figure 12:
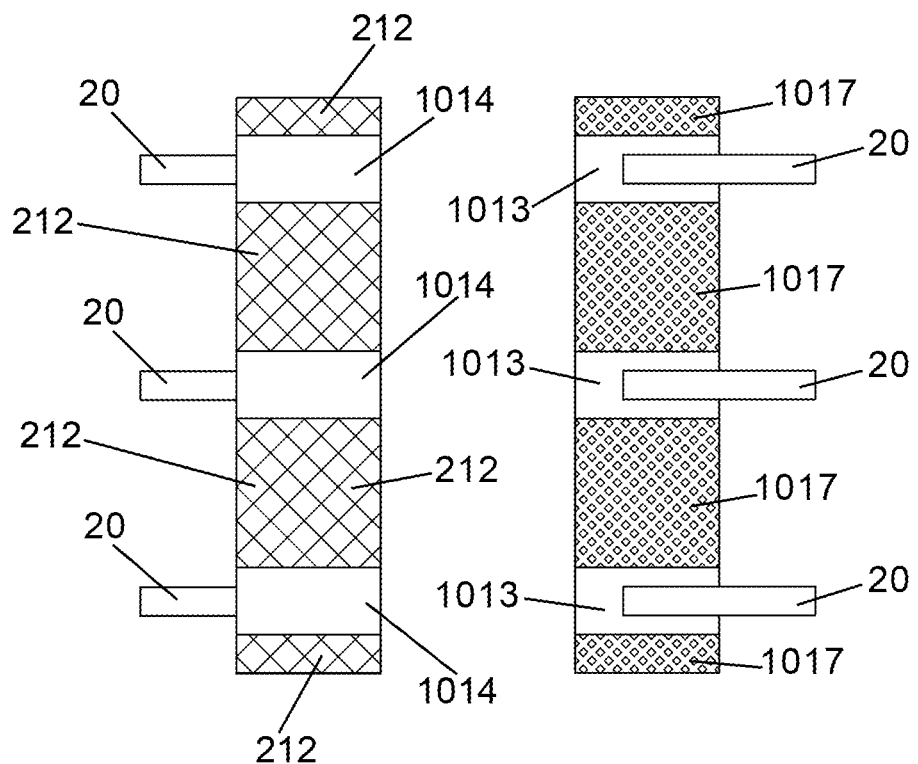
FIG. 12 is a schematic illustration of an embodiment of the invention.

FIG. 11 schematically represents a partially asymmetric anode layer, at least that portion of the second dielectric in the vicinity of the anode lead is exposed without conductive polymer layer thereon. At least a portion of the second dielectric is not coated by conductive polymer and preferably at least 25% to no more than 99% of the area of the second dielectric is covered. That portion which is not covered in conductive polymer is preferably devoted to an area of attachment for the tabs. In FIG. 12 both the first dielectric and second dielectric are incompletely covered by conductive polymer. At least 25% to no more than 99% of the area of each dielectric is covered. That portion which is not covered in conductive polymer is preferably dedicated to an area of attachment for the tabs and this area is often degraded on both sides by tab attachment.

The cathode foil, separators and anode foil are typically provided as a wide roll and slit to size and are preferable conductive foils such as aluminum foil. The foil can be non-conductive, such as a plastic, with conductive layers formed thereon. The anode foil is preferably etched and a dielectric is formed thereon. The dielectric may be formed prior to slitting in which case a subsequent step is desirable to form dielectric on the slit edge prior to application of the conductive polymer coating. The cathode, separator and anode may be treated with a coupling agent, to improve adhesion between the surface and conductive polymer layer, or to impart other specific surface behaviors. The cathode, separator and anode may be washed and dried before or after conductive polymer layer formation or impregnation and the conductive polymer layer formation or impregnation step may be repeated several times if required. Electrical leads, or tabs, are typically electrically connected to the anode and cathode, preferably prior to cutting to length and the leads may be treated with masking material to protect them from farther modification and to keep them ready for welding to capacitor terminals.

The conductive polymer may be applied to the cathode, anode or separator by any suitable method including immersion, coating, and spraying. In immersion the cathode, anode or separator is pulled through a bath or vessel with a conductive polymer dispersion therein. Immersion is preferred for the separator. Coating and spraying may be done with any printing technique including screen printing or spraying of a dispersion of conductive polymer onto the surface of cathode foil, anode foil, or separator. Coating or spraying is preferable for the cathode and anode. It is preferable that the conductive polymer coating be applied to the anode, cathode or separator at an amount of at least 0.1 mg/cm$^2$. Below about 0.1 mg/cm$^2$ the coating weight is insufficient for adequate conduction and incomplete coating may result. It is preferable that the conductive polymer coating be applied in an amount sufficient to achieve a coating weight of no more than about 10 mg/cm$^2$. Above about 10 mg/cm$^2$ the added coating thickness does not appreciably increase the conductivity.

Figure 13:
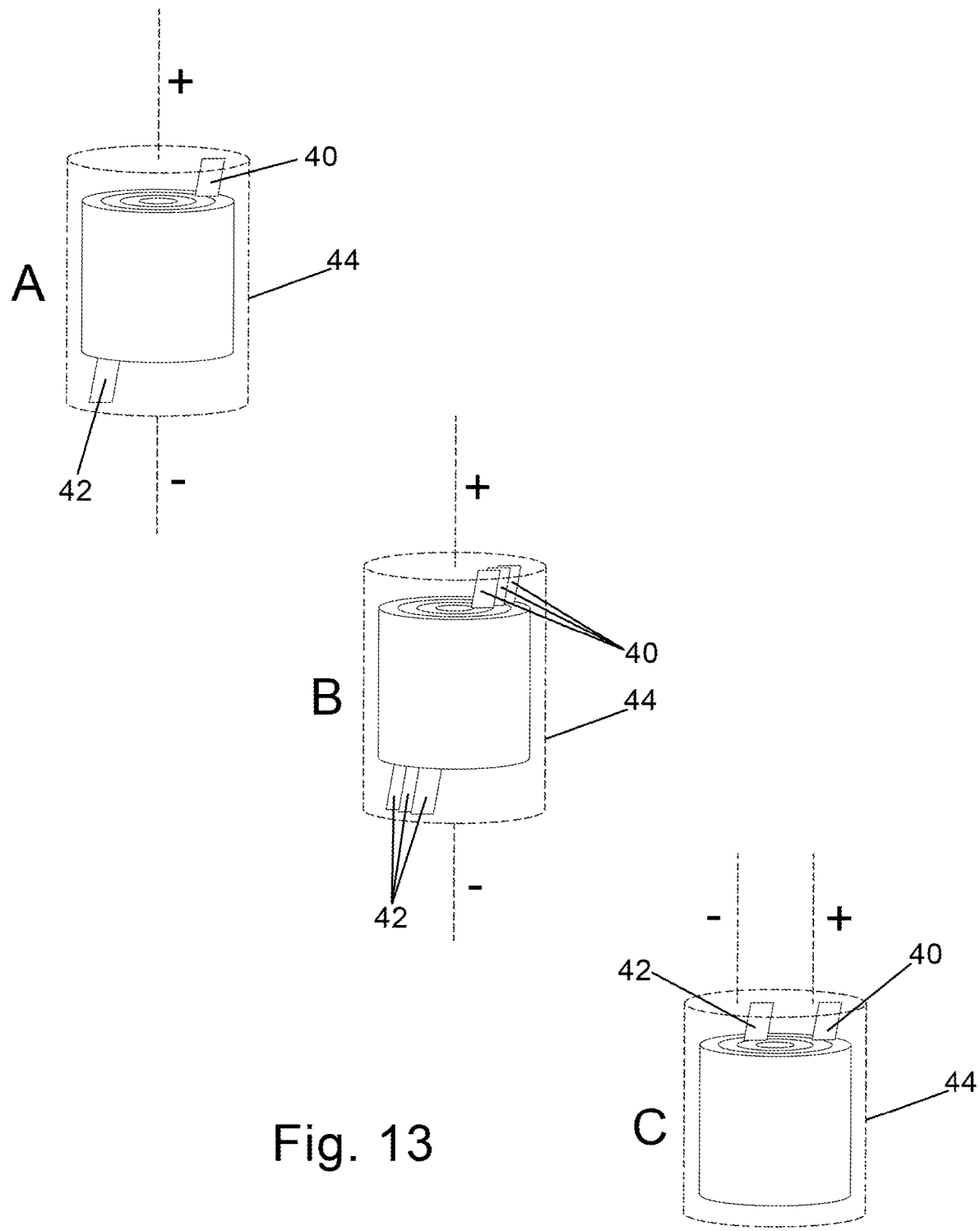
FIG. 13 is a schematic representation of an embodiment of the invention.

An axial capacitor is a particularly preferred embodiment. An axial capacitor has an anode terminal on one face of the capacitor and a cathode terminal on the opposite face. Wound axial capacitors, incorporating conductive polymer electrolytes, have been considered unavailable due to the issues related with polymer impregnation wherein the lower tab or lead is necessarily immersed in the conductive polymer, or precursors, leading to detrimental deposition of conductive polymer thereon. A particular advantage with axial capacitors is the ability to utilize multiple tabs and leads particularly as the length of the anode and cathode increase as is now available with the instant invention. Longer foil lengths lead to a higher percentage of foil resistance culminating in a higher ESR. Multi-tab or multi-leads minimizes the foil resistance effect. With a single lead the current must flow from the furthest extent of the foil to the tab and lead which is detrimental to ESR. It is preferable to utilize multiple anode leads and multiple cathode leads thereby decreasing the conductive path length. Various capacitor configurations will be described with reference to FIG. 13 wherein the capacitors are illustrated schematically in partial shadow view thereby allowing the components to be visualized. In FIG. 13, a single tab axial capacitor is illustrated at A, a multiple tab axial capacitor is illustrated at B and a radial capacitor is illustrated at C. An axial capacitor has anode leads, 40, and cathode leads, 42, extending from opposing sides of the working element, 44, whereas a radial capacitor has anode leads and cathode leads extending from a common side. FIG. 13B illustrates multiple anode tabs, 40, and multiple cathode tabs, 42, extending from the working element wherein each tab is in electrical contact with the anode at a different location. For example, FIG. 13B is illustrated with three tabs, without limit thereto, wherein the tabs are preferably equally spaced along the length of the anode thereby minimizing the length of the conduction path. Similarly, FIG. 13B is illustrated with three cathode leads which are preferably equally spaced along the length of the cathode. Multiple leads are possible with radial capacitors but it has previously been unsuitable for use with hybrid capacitors since the limitation of a small size made the use of multiple leads on a common face difficult to manufacture. Even with a large size single leads are preferable with radial capacitors.

Figure 14:
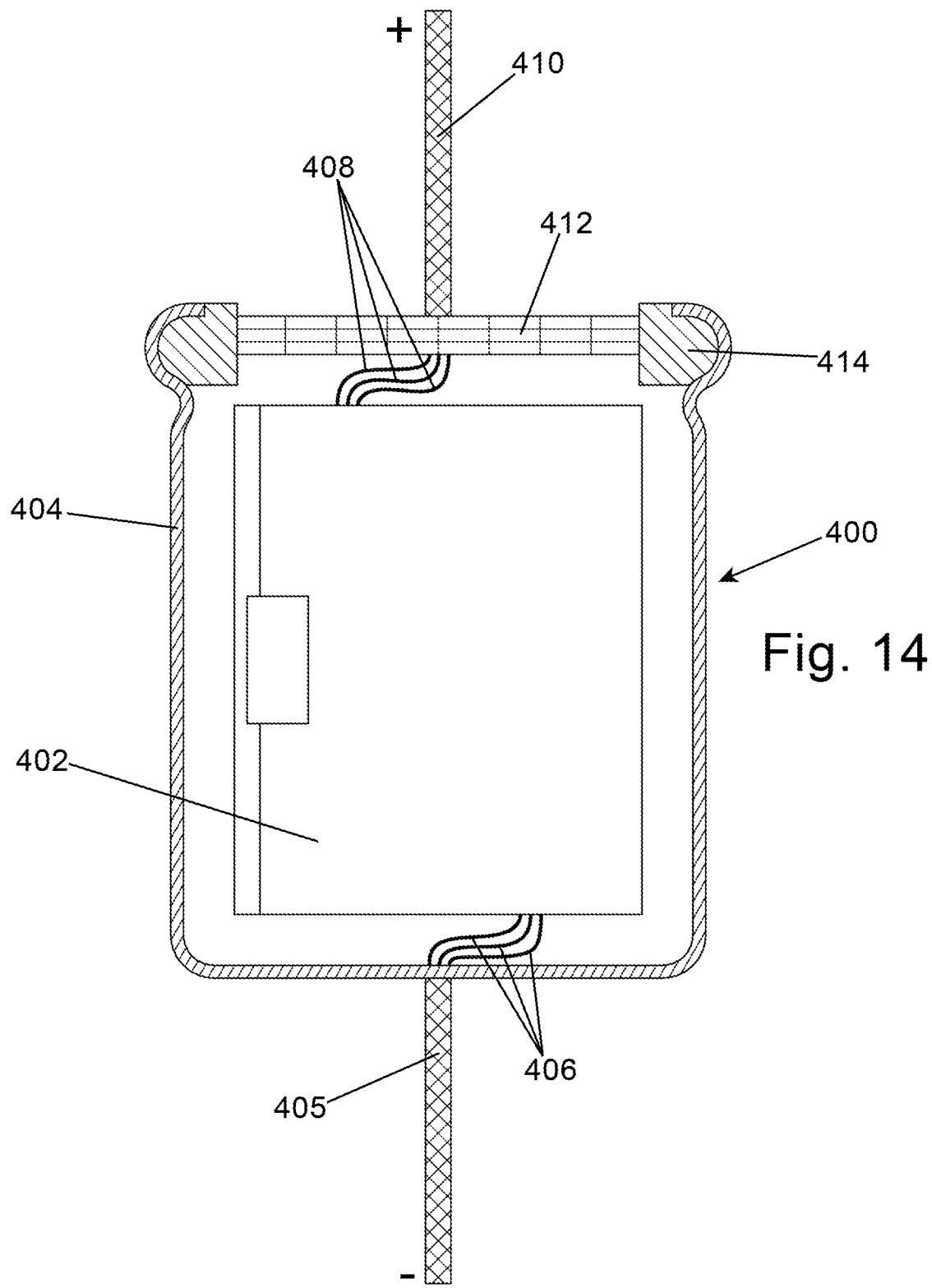
FIG. 14 is a cross-sectional schematic view of an embodiment of the invention.

An axial capacitor is illustrated in cross-sectional schematic view in FIG. 14. In FIG. 14, the capacitor, generally represented at 400, comprises a working element, 402, as described herein, within a housing, 404. The housing, which may be referred to as a can in the art, is preferably conductive and may function as a lead or be in electrical contact with a lower lead, 405, which is preferably the cathode lead. Lower tabs, 406, which are preferably cathode tabs, are in electrical contact with the housing or lower lead. Upper tabs, 408, which are preferably anode tabs, are in electrical contact with an upper lead, 410, which is preferably an anode lead or the upper tabs are in electrical contact with a conductive lid, 412, which is then in electrical contact with the upper lead. A seal, 414, such as a gasket seals the housing to inhibit atmospheric exchange between the interior of the housing and ambient atmosphere. In one embodiment the seal and lid form a hermetic seal. The seal may be a resin material, particularly an epoxy resin or a rubber materials such as ethylene propylene diene terpolymer (EPT) or a butyl rubber (IIR).

The anode is a conductive metal preferably in the form of a foil. The conductive metal is preferably a valve metal or a conductive oxide of the valve metal. Particularly preferred anodes comprise a valve metal such as tantalum, aluminum, niobium, titanium, zirconium, hafnium, alloys of these elements, or a conductive oxide thereof such as NbO. Aluminum is a particularly preferred anode material.

An oxide film is preferably formed on the anode as the dielectric. The dielectric may be formed using any suitable electrolyte solution, referred to as a forming electrolyte, such as a phosphoric acid or a phosphate-containing solution. A formation voltage of from about 9 V to about 450 V is commonly applied. The formation voltage typically ranges from 2.0 to 3.5 times the rated voltage of the capacitor.

The liquid electrolyte is a solvent preferably with a supporting salt therein. Any conventional solvent can be used with exemplary solvents including γ-butyrolactone, sulfolane, ethylene carbonate, propylene carbonate, dimethyl carbonate, ethyl methyl carbonate, acetonitrile, propionitrile, dimethyl formamide, diethyl formamide, water, silicone oil, polyethylene glycol and mixtures thereof. Though not required a supporting salt is preferred. Exemplary supporting salts include inorganic acid ammonium salts, inorganic acid amine salts, inorganic acid alkyl substituted amide salts, organic ammonium salts, organic acid amide salts, organic acid alkyl substituted amide salts and derivatives thereof. Any gas absorbents or cathode electrochemical depolarizers can be used. Exemplary supported additives include nitro derivatives of organic alcohols, acids, esters, aromatic derivatives such as o-, m-, p-nitroanisole, o-, m-, p-nitrobenzoic acid, o-, m-, p-nitrobenzene alcohol. A particularly hybrid capacitor comprises up to 50 wt % liquid electrolyte.

The separator is not particularly limited herein and any commercially available separator can be used to demonstrate the invention with the proviso that it is a material used for the conductive separator can either be coated with, or impregnated with, a conductive polymer. Alternatively, or in addition to the conductive polymer, the separator may itself be a conductive material. Exemplary separators for the conductive separator function as a skeleton layer for the conductive polymer. The separator can be fabricated in the form of a sheet of different dimensions which can be wound in rolls, reels etc. or the separator can be in the form of a paste or gel. The anode foil can function as a support for the separator wherein the anode foil has an insulator layer formed on the surface thereof with a conductive polymer coating on the insulator and with a conductive separator layer formed on the polymer coating. The use of the anode as a support may minimize operating difficulty. The separator is a porous conductive layer which allows direct electrical contact between the anode conductive polymer layer and a cathode. Preferably, the separator has a volume of pores for impregnating electrolyte to transit through. Paper or other non-conductive materials, such as polymers, can be used as support for the conductive polymer. Paper is an exemplary separator due to the widespread use and availability. Unlike prior art capacitors the paper does not need to be charred for use as a conductive separator. In the manufacture of prior art capacitors the paper is often charred after formation of the working element to minimize the amount of polymer absorbed into the paper. With the present invention this is unnecessary since the separator is either coated with conductive polymer or impregnated with conductive polymer to form the conductive separator. The separator may be a fibrous material, such as paper fiber, either physically intermingled or cross-linked to form a continual fibrous, such as paper fiber, layer. The space between the fibers might be partly or fully filled with the high conductivity component. Paper based separators can be manufactured by modification of a finished paper layer or by modification of paper with high conductivity component fibers before forming of paper layer, a dispersion of conductive fibers, pieces, particles or their agglomerates in a liquid or solid state or a deposition of conductive fibers, pieces, particles. The conductive fibers, pieces or particles may comprise a conductive material such as conductive polymer, carbon black, graphite, metal etc., or can be a composite material consisting of a non-conductive core such as paper, plastic etc., modified with a conductive material such as conductive polymer, carbon black, graphite, metal etc.

The conductive separator and non-conductive separator may comprise the same material with the conductive separator having a conductive coating thereon or being impregnated with a conductor neither of which is necessary in the non-conductive separator.

In one embodiment the separator comprises reactive groups, particularly on the surface of the separator, wherein the reactive groups are suitable for reaction with a reactive group of the conductive layer thereby allowing the conductive polymer on the separator to be crosslinked to the conductive polymer thereon to increase the adhesion of the conductive polymer to the separator. Particularly preferred reactive groups include reactive groups such as epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts or quaternary ammonium salts which can be cross-linked with reactive groups on the impregnating electrolyte.

A particularly preferred separator has a width which is suitable for the working element length or production process with a width of 1.5 cm to 500 cm being exemplary for demonstration of the invention. The length is chosen based on the desired capacitance as capacitance is a function of anode and cathode overlap and is therefore directly related to length and width of the cathode and anode. A separator with a length of 0.1 m to 400 m and thickness of 10 µm up to 300 µm is exemplary for demonstration of the invention.

Figure 15:
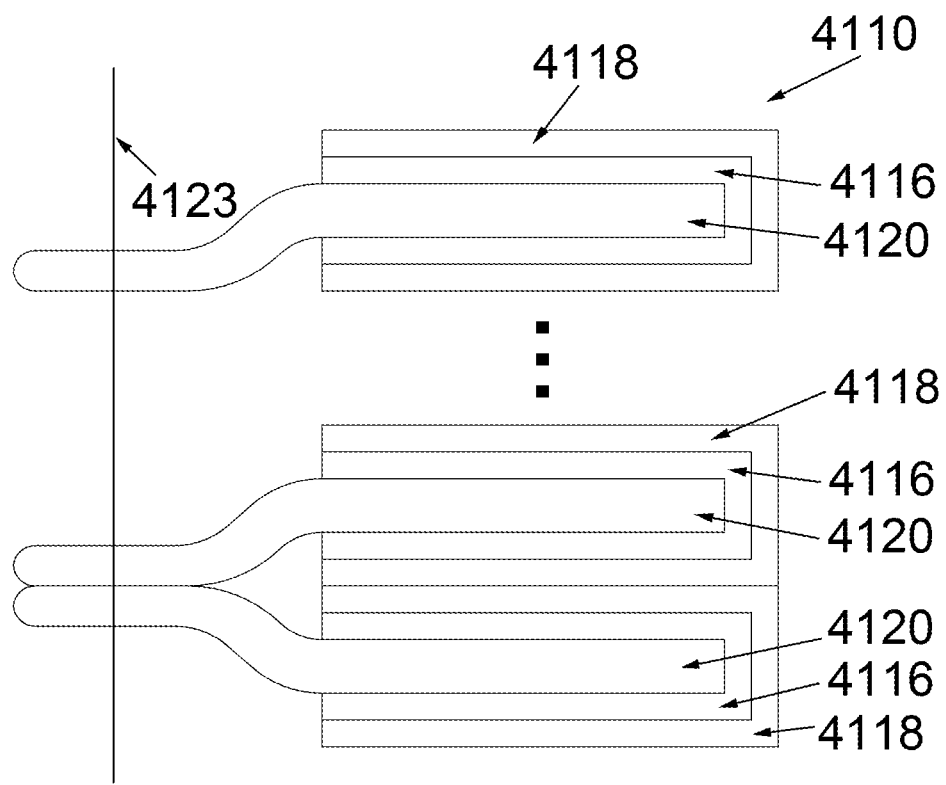
FIG. 15 is a cross-sectional schematic partially-exploded view of an embodiment of the invention.

An embodiment of the invention is illustrated in FIG. 15 wherein a capacitor is generally represented at 4110. A series of anodes foils, 4120, are arranged in parallel fashion. Each anode foil has a dielectric, 4116, thereon. A conductive polymer cathode, 4118, is on each dielectric. The anodes foils have portions which are not coated with conductive polymer which allows for the anode foils to be fused at 4123. The cathodes are commonly terminated.

The conductive polymers is selected from the group consisting of polyanilines, polypyrroles and polythiophenes each of which may be substituted. A particularly preferred polymer comprises conjugated groups having the structure of Formula 1:

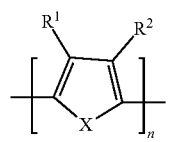

Formula 1 wherein:

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl;

X is S, N or O and most preferable X is S;

$R^1$ and $R^2$ of Formula 1 are preferably chosen to prohibit polymerization at the β-site of the ring as it is most preferred that only α-site polymerization be allowed to proceed; it is more preferred that $R^1$ and $R^2$ are not hydrogen and more preferably, $R^1$ and $R^2$ are α-directors with ether linkages being preferable over alkyl linkages; it is most preferred that the $R^1$ and $R^2$ are small to avoid steric interferences.

In a particularly preferred embodiment the $R^1$ and $R^2$ of Formula I are taken together to represent —O—$(CHR^4)_n$—O— wherein:

n is an integer from 1 to 5 and most preferably 2;

$R^4$ is independently selected from hydrogen; a linear or branched $C_1$ to $C_{18}$ alkyl radical $C_5$ to $C_{12}$ cycloalkyl radical, $C_6$ to $C_{14}$ aryl radical $C_7$ to $C_{18}$ aralkyl radical or $C_1$ to $C_4$ hydroxyalkyl radical, optionally substituted with a functional group selected from carboxylic acid, hydroxyl, amine, substituted amines, alkene, acrylate, thiol, alkyne, azide, sulfate, sulfonate, sulfonic acid, imide, amide, epoxy, anhydride, silane, and phosphate; hydroxyl radical; or $R^4$ is selected from —$(CHR^5)_a$—$R^{16}$; —$O(CHR^5)_a R^{16}$; —$CH_2O(CHR^5)_a R^{16}$; —$CH_2O(CH_2CHR^5O)_a R^{16}$, or $R^4$ is a functional group selected from the group consisting of hydroxyl, carboxyl, amine, epoxy, amide, imide, anhydride, hydroxymethyl, alkene, thiol, alkyne, azide, sulfonic acid, benzene sulfonic acidsulfate, $SO_3M$, anhydride, silane, acrylate and phosphate;

$R^5$ is H or alkyl chain of 1 to 5 carbons optionally substituted with a functional groups selected from carboxylic acid, hydroxyl, amine, alkene, thiol, alkyne, azide, epoxy, acrylate and anhydride;

$R^{11}$ is H or $SO_3M$ or an alkyl chain of 1 to 5 carbons optionally substituted with a functional groups selected from carboxylic acid, hydroxyl, amine, substituted amines, alkene, thiol, alkyne, azide, amide, imide, sulfate, $SO_3M$, amide, epoxy, anhydride, silane, acrylate and phosphate;

a is integer from 0 to 10; and

M is a H or cation preferably selected from ammonia, sodium or potassium.

The conducting polymer can be either a water-soluble or water-dispersible compound. Examples of such a π conjugated conductive polymer include polypyrrole or polythiophene. Particularly preferred conductive polymers include poly(3,4-ethylenedioxythiophene), poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-propane-sulphonic acid, salt), poly(4-(2,3-dihydrothieno-[3,4-b][1,4]dioxin-2-yl)methoxy)-1-methyl-1-propane-sulphonic acid, salt), poly(4-(2,3-dihydrothieno-[3,4-b][1,4]dioxin-2-yl)methoxy alcohol, poly(N-methylpyrrole), poly(3-methylpyrrole), poly(3-octylpyrrole), poly(3-decylpyrrole), poly(3- dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dmethoxythiophene), poly(3,4-ethylenedioxythiophene), poly(3,4-propylenedioxythiophene), poly(3,4-butenedioxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-aniline sulfonate), poly(3-aniline sulfonate), and the like.

Co-polymers composed at least two different copolymerized monomers are contemplated. Co-polymers comprise at least one polymerized monomer selected from the group consisting of polypyrrole, polythiophene, poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-methyl-1-propane-sulphonic acid, salt), poly(N-methylpyrrole), poly(3-methylthiophene), poly(3-methoxythiophene), and poly(3,4-ethylenedioxythiophene).

A particularly preferred polymer is poly-3,4-polyethylene dioxythiophene (PEDOT).

The polyanion in at least bimodal conductive particles is a homopolymer of polystyrenesulfonic acid or salt of polystyrenesulfonate, and/or random copolymer comprising groups A, B and C represented by the ratio of Formula 2:

$$A_xB_yC_z \qquad \text{Formula 2}$$

wherein:
A is polystyrenesulfonic acid or salt of polystyrenesulfonate;
B and C separately represent polymerized units substituted with a group selected from:
-Carboxyl groups;
—C(O)OR$^6$ wherein R$^6$ is selected from the group consisting of:
  an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
  —(CHR$^7$CH$_2$O)$_b$—R$^8$ wherein:
  R$^7$ is selected from a hydrogen or an alkyl of 1 to 7 carbons and preferably hydrogen or methyl;
  b is an integer from 1 to the number sufficient to provide a molecular weight of up to 200,000 for the —CHR$^7$CH$_2$— group; and
  R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;

—C(O)—NHR$^9$ wherein:
  R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{10}$ wherein:
  R$^{10}$ is selected from:
  a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
  a reactive group selected from the group consisting of hydroxyl, carboxyl, amine, epoxy, silane, imide, amide, thiol, alkene, alkyne, phosphate, azide, acrylate, anhydride and
  —(O(CHR$^{11}$CH$_2$O)$_d$—R$^{12}$ wherein:
  R$^{11}$ is a hydrogen or an alkyl of 1 to 7 carbons and preferably hydrogen or methyl;
  d is an integer from 1 to the number sufficient to provide a molecular weight of up to 200,000 for the —CHR$^{11}$CH$_2$O— group;
  R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
  R$^{13}$ is selected from:
  a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
  a reactive group selected from the group consisting of epoxy, silane, alkene, alkyne, acrylate, phosphate and
  —(CHR$^{14}$CH$_2$O)$_e$—R$^{15}$ wherein:
  R$^{14}$ is a hydrogen or an alkyl of 1 to 7 carbons and preferably hydrogen or methyl;
  e is an integer from 1 to the number sufficient to provide a molecular weight of up to 200,000 for the —CHR$^{14}$CH$_2$O— group; and
  R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;

x, y and z, taken together are sufficient to form a polyanion with a molecular weight of at least 100 to no more than 500,000 and y/x is 0 to 100 more preferably 0.01 to 100; z is 0 to a ratio z/x of no more than 100; more preferably x represents 50-99%, y represents 1 to 50% and z represents 0 to 49% of the sum total of x+y+z; even more preferably x represents 70-90%; y represents 10 to 30% and z represents 0 to 20% of the sum total of x+y+z.

A particular feature of the instant invention is the ability to adjust the ratio of conductive polymer to polyanion for the different particle sizes due to the difference in surface area and size. It is preferred that the molar ratio of conductive polymer to polyanion for each of the smaller particle size portion and the larger size portion be in the range of 1:0.1 to 0.1:1, more preferably 1:1 to 0.2:1 and even more preferably 0.8:1 to 0.25:1. In an embodiment the molar ratio of conductive polymers to polyanion is higher for the first particles, having a larger average diameter, than in the second particles having the smaller average diameter. More preferably, the molar ratio of conductive polymers to polyanion is 10% larger for the smaller particle size portion than in the larger particle size portion. Without being limited to theory, the increased molar ratio for the smaller particle sizes improves the interparticle packing in the coating thereby improving the quality of the coating, particularly, on the edges and corners.

Another particular feature of the invention is the ability to adjust the molecular weight of the polyanion for the two portions of the dispersion having different particle sizes. The preferred molecular weight of polyanion for each of the smaller particle size portion of the dispersion and the larger particle size portion of the dispersion is at least about 600 to no more than about 500,000. In an embodiment the polyanion can have a different molecular weight for the large particle size portion than for the small particle size portion.

The dispersion of particles of conductive polymer and polyanion having multiple particle sizes is preferably formed by high shear polymerization with a rotor-stator system at high solids content such as above about 3 wt % of mixture of monomer and polyanion. While not limited to theory it is hypothesized that a combination of the monomer concentration and high shear kinetics facilitates the growth of particles having a mixture of particle sizes. High shear rotor-stator polymerization is described in U.S. Pat. No. 9,030,806 which is incorporated herein by reference. In one embodiment a portion of the dispersion is further subjected to rotor-stator high shear mixing, ultrasonic mixing, acoustic mixing, high-pressure homogenizer or a high shearing homogenizer.

However, the preparation of dispersion with particles of conductive polymer and polyanion having a mixture of sizes may be prepared by other methods, including mixing, and may not be limited to high shear rotor-stator polymerization.

A particular feature of the inventive dispersion is the decreased viscosity relative to monomodal dispersions at a given percent solids loading for the dispersion. The lower viscosity, at higher solids content, improves the coating quality especially at the edges and corners of the anodized anode. The inventive dispersion with multiple particle sizes has a viscosity of at least 2000 cP at 6 rpm to no more than 5000 cP at 6 rpm when polymerized at 3.56% solids input of mixture of monomer and polyanion during polymerization. With monomodal sized particles the viscosity is above 6000 cP at 6 rpm when polymerized with 2.1% solids input of monomer and polyanion and increases with increased % solids input. The ability to apply a dispersion with higher percent solids at low viscosity is advantageous for improved coating quality.

The dispersion of conducting polymer with an at least bimodal particle size distribution may further comprise a polymeric dopant. A preferred polymeric dopant is polystyrene sulfonate (PSS). Polystyrene sulfonic acid (PSSA) copolymer is a particularly preferred dopant particularly as a copolymer with polyethylene glycol monoacrylate.

The conductive polymer solution or dispersion preferably comprises reactive monomers as film formers which can improve polymer film strength upon drying of the film. The reactive monomer or oligomers can be soluble in water or organic solvent or disperse in water through the use of ionic/non-ionic surfactants. The reactive monomers can have average functionalities of at least two or more. The curing process of the monomer can be catalyzed by using heat, radiation or chemical catalysis. Exemplary monomers include compounds having more than one epoxy group includes ethylene glycol diglycidyl ether (EGDGE), propylene glycol diglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitl-DGE), sorbitol polyglyidyl ethers, polyethylene glycol diglycidyl ether (PEGDGE), polypropylene glycol diglycidyl ether, polytetramethylene glycol diglycidyl ether, di(2,3-epoxypropyl) ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether, maleimide-epoxy compounds, diglycidyl ether, glycidyl acrylate, glycidyl Methacrylate, bisphenol A epoxy, epoxidized Bisphenol A novolac modified epoxy, urethane modified Bisphenol A epoxy, an epoxidized o-cresylic novolac and so forth.

Additional film formers are monomers containing acidic groups. Exemplary acidic monomers include: oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, trimesic acid, polyacrylic acid, etc. Particularly preferred organic acids are aromatic acid such as phthalic acid, and particularly ortho-phthalic acid.

Film forming monomers containing alcohol/acrylate groups can be employed. Exemplary monomers include: diethylene glycol, pentaerythritol, triethylene glycol, oligo/polyethylene glycol, triethylene glycol monochlorohydrin, diethylene glycol monochlorohydrin, oligo ethylene glycol monochlorohydrin, triethylene glycol monobromohydrin, diethylene glycol monobromohydrin, oligo ethylene glycol monobromohydrin, polyethylene glycol, polyether, polyethylene oxide, triethylene glycol-dimethylether, tetraethylene glycol-dimethylether, diethylene glycol-dimethylether, diethylene glycol-diethylether-diethylene glycol-dibutylether, dipropylene glycol, tripropylene glycol, polypropylene glycol, polypropylene dioxide, polyoxyethylene alkylether, polyoxyethylene glycerin fatty acid ester, polyoxyethylene fatty acid amide, 2-hydroxyethyl methacrylate, 2-hydroxypropyl methacrylate, n-butoxyethyl methacrylate, n-butoxyethylene glycol methacrylate, methoxytriethylene glycol methacrylate, methoxypolyethylene glycol methacrylate, 2-hydroxyethyl acrylate, 2-hydroxypropyl acrylate, n-butoxyethyl acrylate, n-butoxyethylene glycol acrylate, methoxytriethylene glycol acrylate, methoxypolyethylene glycol acrylate, and the like; bifunctional (meth)acrylate compounds, such as, ethylene glycol di(meth)acrylate, diethylene glycol di(meth)acrylate, triethylene glycol di(meth)acrylate, polyethylene glycol di(meth)acrylate, neopentyl glycol di(meth)acrylate, glycerin di(meth)acrylate, and the like; glycidyl ethers, such as, ethylene glycol diglycidyl ether, glycidyl ether, diethylene glycol diglycidyl ether, triethylene glycol diglycidyl ether, polyethylene glycol diglycidyl ether, propylene glycidyl ether, tripropylene glycidyl ether, polypropylene glycidyl ether, glycerin diglycidyl ether, and the like; glycidyl methacrylate, trimethylolpropane triacrylate, ethylene oxide-modified trimethylolpropane triacrylate, ethylene oxide-modified pentaerythritol triacrylate, ethylene oxide-modified pentaerythritol tetraacrylate, and the like.

The external polymer layers may also independently comprise film forming polyanions containing reactive groups such as epoxy, alcohol, silanes, phosphates, amine, alkene, thiol, alkyne, azide carboxylic acid.

The external polymer layers may also independently comprise, as film formers, linear hyperbranched polymers described in U.S. Pat. No. 9,378,898. The external polymer layer may comprise a linear-hyperbranched polymer where the linear block has at least two reactive end functional groups selected from hydroxyl groups, amino groups, epoxy, acrylate, acid etc. and where the hyper-branched block comprises polyether-epoxy, polyester-epoxy, polyester-silanol, polyester-acid, polyether-alcohol, polyamide-acid, polyether-acrylate, polyether-silanol and polyester-amine pendant groups.

The external polymer layers may further independently comprise work function modifiers described in U.S. Publ. Appl. No. 20150348715. Exemplary work function modifiers include organotitanate derivatives preferably selected from the group consisting of di-alkoxy acyl titanate, tri-alkoxy acyl titanate, alkoxy triacyl titantate, alkoxy titantate, neoalkoxy titanate, titanium IV 2,2(bis 2-propenoatomethyl) butanoato, tris neodecanoato-O; titanium IV 2,2(bis 2-propenoatomethyl)butanoato, iris(dodecyl)benzenesulfonato-O; titanium IV 2,2(bis 2-propenoatomethyl)butanoato, tris (dioctyl)phosphato-O; titanium IV 2,2(bis 2-propenolatomethyl)tris(dioctyl)pyrophosphatobutanolato-O; titanium IV 2,2(bis 2-propenolatomethyl)butanolato, tris (2-ethylenediamino)ethylato; and titanium IV 2,2(bis 2-propenolatomethyl)butanolato, tris(3-amino)phenylato being representative neoalkoxy titanates and derivatives thereof. Furthermore, the work function modifier can be a compound selected from the group consisting of cycloaliphatic epoxy resin, ethylene glycol diglycidyl ether, bisphenol A epoxy resin, bisphenol F epoxy resin, bisphenol S epoxy resin, novolac epoxy resin, aliphatic epoxy resin, glycidylamine epoxy resin, ethylene glycol diglycidyl ether (EGDGE), propylene glycol diglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitol-DGE), sorbitol polyglycidyl ethers, polyethylene glycol diglycidyl ether (PEGDGE), polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether, maleimide-epoxy compounds, and derivatives thereof.

External polymer layers may further independently comprise nonionic polymers such as a hydroxy-functional nonionic polymer. The term "hydroxy-functional" generally means that the compound contains at least one hydroxyl functional group. The molecular weight of the hydroxy-functional polymer may be from about 100 to 10,000 grams per mole, in some embodiments from about 200 to 2,000, in some embodiments from about 300 to about 1,200, and in some embodiments, from about 400 to about 800.

Any of a variety of hydroxy-functional nonionic polymers may generally be employed. In one embodiment, for example, the hydroxy-functional polymer is a polyalkylene ether. Polyalkylene ethers may include polyalkylene glycols such as polyethylene glycols, polypropylene glycols polytetramethylene glycols, polyepichlorohydrins; polyoxetanes, polyphenylene ethers, polyether ketones, and the like. Polyalkylene ethers are typically predominantly linear, nonionic polymers with terminal hydroxy groups. Particularly suitable are polyethylene glycols, polypropylene glycols and polytetramethylene glycols (polytetrahydrofurans). The diol component may be selected, in particular, from saturated or unsaturated, branched or unbranched, aliphatic dihydroxy compounds containing 5 to 36 carbon atoms or aromatic dihydroxy compounds, such as, for example, pentane-1,5-diol, hexane-1,6-diol, neopentyl glycol, bis-(hydroxymethyl)-cyclohexanes, bisphenol A, dimer diols, hydrogenated dimer diols or even mixtures of the diols mentioned.

In addition to those noted above, other hydroxy-functional nonionic polymers may also be employed. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10\text{-}16}$—$(O$—$C_2H_4)_{1\text{-}2}$—$OH$ (e.g., octaethylene glycol monododecyl ether and pentaethylene glycol monododecyl ether); polyoxypropylene glycol alkyl ethers having the general formula: $CH_3$—$(CH_2)_{10\text{-}16}$—$(O$—$C_3H)_{1\text{-}25}$—$OH$; polyoxyethylene glycol octylphenol ethers having the following general formula: $C_3$—$H_{17}$—$(C_6H_4)$—$(O$—$C_2H_4)_{1\text{-}25}$—$OH$ (e.g., Triton™ X-100); polyoxyethylene glycol alkylphenol ethers having the following general formula: $C_9$—$H_{19}$—$(C_6H_4)$—$(O$—$C_2H_4)$—$_{1\text{-}25}$—$OH$ (e.g., nonoxynol-9); polyoxyethylene glycol esters of $C_8$-$C_{24}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether); block copolymers of polyethylene glycol and so forth.

The conductive polymer solution or dispersion may have a pH of 1 to 14, preference being given to a pH of 1 to 10, particularly preferred is a pH of 1 to 8 with the pH being measured at 25° C. To adjust the pH, bases or acids, for example, can be added to the solutions or dispersions. The bases used may be inorganic bases, for example sodium hydroxide, potassium hydroxide, calcium hydroxide or ammonia, or organic bases, for example ethylamine, diethylamine, triethylamine, propylamine, dipropylamine, tripropylamine, isopropylamine, diisopropylamine, butylamine, dibutylamine, tributylamine, isobutylamnine, diisobutylamine, triisobutylamine, 1-methylpropylamine, methylethylamine, bis(1-methyl)propylamine, 1,1-dimethylethylamine, pentylamine, dipentylamine, tripentylamine, 2-pentylamine, 3-pentylamine, 2-methyl-butylamine, 3-methylbutylamine, bis(3-methyl-butylamine), tris(3-methylbutylamine), hexylamine, octylamnine, 2-ethylhexylamine, decylamine, N-methyl-butylamine, N-ethylbutylamine, N,N-dimethylethylamine, N,N-dimethylpropyl, N-ethyldiisopropylamine, allylamine, diallylamine, ethanolamine, diethanolamine, triethanolamine, methylethanolamine, methyl-diethanolamine, dimethylethanolamine, diethyl-ethanolamine, N-butylethanolamine, N-butyldiethanol-amine, dibutylethanolamine, cyclohexylethanolamine, cyclohexyldiethanolamine, N-ethylethanolamine, N-propylethanolamine, tert-butylethanolamine, tert-butyl-diethanolamine, propanolamine, dipropanolamine, tripropanolamine or benzylamine, bi-, tri-, or tetra-functional amines. The acids used may be inorganic acids, for example sulfuric acid, phosphoric acid or nitric acid, or organic acids, for example carboxylic or sulfonic acids.

Figure 2:
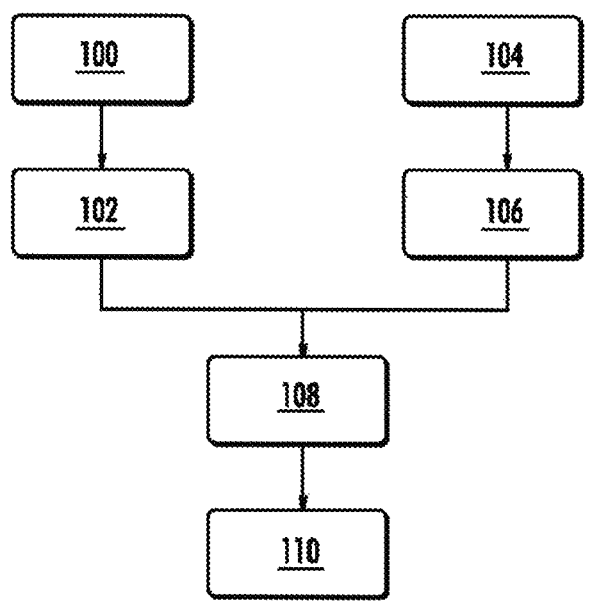
FIG. 2 is a flow chart representation of an embodiment of the invention.

The process for forming a capacitor will be described with reference to FIG. 2 wherein the process is represented schematically. In FIG. 2, droplets of monomer are formed in monomer solution comprising at least 3 wt % monomer and polyanion to no more than 10 wt % monomer and polyanion at 100 preferably by a stator rotor. The droplets are then polymerized by high shear polymerization preferably in the presence of polyanion thereby forming a polymer dispersion at 102 wherein the polymer dispersion comprises at least a bimodal size distribution of conducting polymer/polyanion particles. An anode is prepared at 104 wherein the anode is a conductor, and preferably a valve metal. A dielectric is formed on the anode at 106 wherein the preferred dielectric is an oxide of the anode. A conductive polymer layer of the polymer is formed on the dielectric at 108 thereby forming a conductive couple with a dielectric there between. At least one layer of the conductive polymer layer is formed by application of the dispersion comprising the conductive polymer/polyanion particles in at least a bimodal size distribution. The dispersion is preferably applied by dipping. In a preferred embodiment an internal polymer layer is formed prior to application of the dispersion comprising the conductive polymer/polyanion particles in at least a bimodal size distribution. The capacitor is finished at 110 wherein finishing can include but is not limited to testing, forming external terminations, encapsulating and the like.

The anode material is not limited herein. A particularly preferred anode material is a metal and a particularly preferred metal is a valve metal or a conductive oxide of a valve metal. Particularly preferred anodes include niobium, aluminum, tantalum and NbO without limit thereto.

The dielectric is not particularly limited herein. A particularly preferred dielectric is an oxide of the anode due to manufacturing considerations.

Throughout the description terms such as "alkyl", "aryl", "alkylaryl", "arylalkyl" refer to unsubstituted or substituted groups and if already listed as substituted, such as "alkyl alcohol" refer to groups which are not further substituted or may be further substituted.

Test Methods
Corners and Edge Coverage Measurement

Corner and edge coverage of conducting polymer dispersions on an anodized anode in solid electrolytic capacitors was inspected under a microscope and scaled per the following criteria: corners and edges not covered 85%, edges covered and corners not covered 90%, edges covered and half of corners covered 95%; corners and edges appear completely covered 100%.

Particle Size Analysis

The particle size of conducting polymer:polyanion complex particles was measured using a disk centrifuge particle size analyzer from CPS instruments. A diameter distribution of the particles relates to a weight distribution of the particles in the dispersion as a function of the particle diameter. In this context, the $D_{10}$ value of the diameter distribution states that 10% of the total weight of all the particles of conductive polymer polyanion complex in the dispersion can be assigned to particles which have a diameter of less than or equal to the $D_{10}$ value. The $D_{50}$ value of the diameter distribution states that 50% of the total weight of all the particles of conductive polymer in the dispersion can be assigned to particles which have a diameter of less than or equal to the $D_{50}$ value. The $D_{90}$ value of the diameter distribution states that 90% of the total weight of all the particles of conductive polymer in the dispersion can be assigned to particles which have a diameter of less than or equal to the $D_{90}$ value.

EXAMPLES

Example 1

Poly(4-styrenesulfonic acid-co-poly(ethylene glycol) methacrylate) sodium salt was synthesized. A 500 ml flask was initially charged with 33 ml deionized water as a solvent. After adding 8 g styrenesulfonic acid sodium salt, 2 g poly(ethylene glycol) methyl ether methacrylate (Mn 480) and 1 g ammonium persulfate, the mixture was saturated with nitrogen by means of a gas inlet tube. Nitrogen was passed through the mixture for 15 min. and during this time, the mixture was heated to 80° C. The flask was sealed with a rubber septum and the solution was allowed to polymerize for 16 hours. The resulting polyanion copolymer was acidified with dilute sulfuric acid and used directly for preparation of conducting polymer dispersion.

Example 2

The conductive polymer dispersion was synthesized by high shear polymerization. 1740 g of DI water and 166 g of PSSA 30% (Alfa Aesar) were charged into a 4 L polyethylene bottle. The reaction solution was purged with nitrogen for 0.5-1 hr. The contents were mixed using a rotor-stator mixing system with perforated stator screen with a round hole diameter of 1.5 mm. Subsequently, 57 g of 1% ferric sulfate solution and 43 g of sodium persulfate were then added into the reaction mixture, followed by dropwise addition of 22.5 g of 3,4-ethylenedioxythiophene (EDOT) (Baytron M from Heraeus). The reaction mixture containing 3.56% solids of monomer and polyanion was sheared continuously with a shear speed at 4200 rpm for 24 hours. 600 g of Lewatit S108H and 600 g of Lewatit MP62WS ion exchange resins were added into the slurry and rolled at around 60 rpm overnight. The conductive polymer dispersion was separated from resins by filtration. The resulting poly(3,4-ethylenedioxythiophene)/polystyrene sulfonic acid dispersion had a bimodal particle size distribution with second particle having a $D_{50}$ particle size of 350 nm and first particle having a $D_{50}$ particles size of 3.50 micron.

Example 2-1

The conducting polymer dispersion prepared as per procedure in example 2 was further homogenized with an ultrasonicator. The resulting dispersion also has bimodal particle size distribution with D50 of 25 nm and 75 nm.

Example 3

1740 g of DI water and 166 g of polyanion copolymer (30%) from Example 1 were charged into a 4 L polyethylene bottle. The reaction solution was purged with nitrogen for 0.5-1 hr. The contents were mixed using a rotor-stator mixing system with perforated stator screen with a round hole diameter of 1.5 mm. Subsequently, 57 g of 1% ferric sulfate solution and 43 g of sodium persulfate were then added into the reaction mixture, followed by dropwise addition of 22.5 g of 3,4-ethylenedioxythiophene (EDOT) (Baytron M from Heraeus). The reaction mixture containing 3.56% solids of monomer and polyanion was sheared continuously with a shear speed at 4200 rpm for 24 hours. 600 g of Lewatit S108H and 600 g of Lewatit MP62WS ion exchange resins were added into the slurry and rolled at around 60 rpm overnight. The conductive polymer dispersion was separated from resins by filtration. The resulting poly(3,4-ethylenedioxythiophene)/poly(4-styrenesulfonic acid-co-poly(ethylene glycol) methacrylate) dispersion had a bimodal particle size distribution with second particle having a $D_{50}$ particles size of 250 nm and first particle having a $D_{50}$ particles size of 3.50 micron.

Example 3-1

The conducting polymer dispersion prepared as per procedure in example 3 was further homogenized with an ultrasonicator. The resulting dispersion also has bimodal particle size distribution with D50 of 20 nm and 65 nm.

Example 4

2805 g of DI water and 336 g of polyanion copolymer (40%) from Example 1 were charged into a 4 L polyethylene bottle. The reaction solution was purged with nitrogen for 0.5-1 hr. The contents were mixed using a rotor-stator mixing system with perforated stator screen with a round hole diameter of 1.5 mm. Subsequently, 141.3 g of 1% ferric sulfate solution and 106.65 g of sodium persulfate were then added into the reaction mixture, followed by dropwise addition of 22.5 g of 3,4-ethylenedioxythiophene (EDOT) (Baytron M from Heraeus). The reaction mixture containing 5.20% solids of monomer and polyanion was sheared continuously with a shear speed at 4200 rpm for 24 hours. 1486 g of Lewatit S108H and 1486 g of Lewatit MP62WS ion exchange resins were added into the slurry and rolled at around 60 rpm overnight. The conductive polymer dispersion was separated from resins by filtration. The resulting poly(3,4-ethylenedioxythiophene)/poly(4-styrenesulfonic acid-co-poly(ethylene glycol) methacrylate) dispersion had a bimodal particle size distribution with first particle having a $D_{50}$ particles size of 3.50 micron and second particle having a $D_{50}$ particles size of 300 nm.

Example 5

2531 g of DI water and 125 g of PSSA 30% (Alfa Aesar) were charged into a 4 L polyethylene bottle. The reaction solution was purged with nitrogen for 0.5-1 hr. The contents were mixed using a rotor-stator mixing system with perforated stator screen with a round hole diameter of 1.5 mm. Subsequently, 28.5 g of 1% ferric sulfate solution and 21.5 g of sodium persulfate were then added into the reaction mixture, followed by dropwise addition of 11.25 g of 3,4-ethylenedioxythiophene (EDOT) (Baytron M from Heraeus). The reaction mixture containing 1.79% solids of monomer and polyanion was sheared continuously with a shear speed at 4200 rpm for 24 hours. 300 g of Lewatit S108H and 300 g of Lewatit MP62WS ion exchange resins were added into the slurry and rolled at around 60 rpm overnight. The conductive polymer dispersion was separated from resins by filtration. The resulting poly(3,4-ethylenedioxythiophene)/polystyrene sulfonic acid dispersion had a monomodal particle size distribution with a $D_{50}$ particles size of 110 nm.

Example 6

2531 g of DI water and 125 g of polyanion copolymer (30%) from Example 1 were charged into a 4 L polyethylene bottle. The reaction solution was purged with nitrogen for 0.5-1 hr. The contents were mixed using a rotor-stator mixing system with perforated stator screen with a round hole diameter of 1.5 mm. Subsequently, 28.5 g of 1% ferric sulfate solution and 21.5 g of sodium persulfate were then added into the reaction mixture, followed by dropwise addition of 11.25 g of 3,4-ethylenedioxythiophene (EDOT) (Baytron M from Heraeus). The reaction mixture containing 1.79% solids of monomer and polyanion was sheared continuously with a shear speed at 4200 rpm for 24 hours. 300 g of Lewatit S108H and 300 g of Lewatit MP62WS ion exchange resins were added into the slurry and rolled at around 60 rpm overnight. The conductive polymer dispersion was separated from resins by filtration. The resulting poly(3,4-ethylenedioxythiophene)/poly(4-styrenesulfonic acid-co-poly(ethylene glycol) methacrylate) dispersion had a monomodal particle size distribution with a $D_{50}$ particle size of 80 nm.

Example 7

Conducting polymer dispersions from Example 2 were mixed with DMSO, 3-glycidoxypropyltrimethoxysilane and reactive monomer/oligomer containing at least three epoxy groups followed by mixing on roller overnight.

Example 8

Conducting polymer dispersions from Example 3 were mixed with DMSO, 3-glycidoxypropyltrimethoxysilane and reactive monomer/oligomer containing at least three epoxy groups followed by mixing on roller overnight.

Example 8-1

Conducting polymer dispersions formulated in same manner as Example 8 except mixture of conducting polymer dispersion from Example 3 and example 3-1 in ratio of 2:8 were used.

Example 9

Conducting polymer dispersions from comparative Example 1 were mixed with DMSO, 3-glycidoxypropyltrimethoxysilane and reactive monomers containing two epoxy and two carboxylic groups followed by mixing on roller overnight.

Example 10

Conducting polymer dispersions from comparative Example 2 were mixed with DMSO, 3-glycidoxypropyltrimethoxysilane and reactive monomer/oligomer containing at least three epoxy groups followed by mixing on roller overnight.

Example 11

Solid electrolytic capacitors were prepared by standard techniques. A series of tantalum anodes (33 microfarads, 35V) were prepared. The tantalum was anodized to form a dielectric on the tantalum anode. The anodes thus formed were dipped into a solution of iron (III) toluenesulfonate oxidant for 1 minute and sequentially dipped into ethyldioxythiophene monomer for 1 minute to form a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. Conductive polymer dispersion from Example 5 was applied and subsequently dried to form an external polymer layer. This process were repeated 4 times. The parts were inspected under microscope for corners and edge coverage. A sequential coating of a graphite layer and a silver layer were applied to produce a solid electrolytic capacitor. Parts were assembled and packaged.

Example 12

A series of tantalum anodes (33 microfarads, 35V) were prepared. The tantalum were anodized to form a dielectric on the tantalum anode. The anodes thus formed was dipped into a solution of iron (Ill) toluenesulfonate oxidant for 1 minute and sequentially dipped into ethyldioxythiophene monomer for 1 minute to form an a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. Conductive polymer dispersion from Example 8 was applied and subsequently dried to form an external polymer layer. This process were repeated 4 times. The parts were inspected under microscope for corners and edge coverage. A sequential coating of a graphite layer and a silver layer were applied to produce a solid electrolytic capacitor. Parts were assembled and packaged.

Example 12-1

A solid electrolytic capacitor were produced in same manner as shown in inventive Example 12 except conductive polymer dispersion from Example 6-1 was used.

Example 12-2

A solid electrolytic capacitor were produced in same manner as shown in inventive Example 12-1 except internal layer was formed by pre-polymerized conductive polymer.

Example 12-3

A solid electrolytic capacitor were produced in same manner as shown in inventive Example 12-2 except organometalic compound was applied between dielectric and pre-polymerized conducting polymer.

Example 12-4

A solid electrolytic capacitor were produced in same manner as shown in inventive Example 12-3 except crosslinker solution was applied between external polymer layers.

Example 12-5

A solid electrolytic capacitor were produced in same manner as shown in inventive Example 12-3 except crosslinker or primer solution was applied between internal polymer layer and external polymer.

Example 13

A series of tantalum anodes (33 microfarads, 35V) were prepared. The tantalum was anodized to form a dielectric on the tantalum anode. The anodes thus formed was dipped into a solution of iron (Ill) toluenesulfonate oxidant for 1 minute and sequentially dipped into ethyldioxythiophene monomer for 1 minute to form a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. Conductive polymer dispersion from comparative Example 3 was applied and subsequently dried to form an external polymer layer. This process were repeated 4 times. The parts were inspected under microscope for corners and edge coverage. A sequential coating of a graphite layer and a silver layer were applied to produce a solid electrolytic capacitor. Parts were assembled and packaged.

Example 14

A series of tantalum anodes (33 microfarads, 35V) were prepared. The tantalum was anodized to form a dielectric on the tantalum anode. The anodes thus formed were dipped into a solution of iron (III) toluenesulfonate oxidant for 1 minute and sequentially dipped into ethyldioxythiophene monomer for 1 minute to form an a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. Conductive polymer dispersion from Comparative Example 4 was applied and subsequently dried to form an external polymer layer. This process was repeated 4 times. The parts were inspected under microscope for corners and edge coverage. A sequential coating of a graphite layer and a silver layer were applied to produce a solid electrolytic capacitor. Parts were assembled and packaged.

Example 15

A series of tantalum anodes (33 microfarads, 35V) were prepared. The tantalum was anodized to form a dielectric on the tantalum anode. The anodes thus formed were dipped into a solution of iron (III) toluenesulfonate oxidant for 1 minute and sequentially dipped into ethyldioxythiophene monomer for 1 minute to form an a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. A commercial conductive polymer dispersion Clevios® KV2 was applied and subsequently dried to form an external polymer layer. This process was repeated 4 times. The parts were inspected under microscope for corners and edge coverage. A sequential coating of a graphite layer and a silver layer were applied to produce a solid electrolytic capacitor. Parts were assembled and packaged.

Example 16

A series of tantalum anodes (33 microfarads, 35V) were prepared. The tantalum was anodized to form a dielectric on the tantalum anode. The anodes thus formed was dipped into a solution of iron (Ill) toluenesulfonate oxidant for 1 minute and sequentially dipped into ethyldioxythiophene monomer for 1 minute to form an a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. Conductive polymer dispersion from Example 10 was applied to form an external polymer layer. After drying, alternating layers of a commercial crosslinker solution, Clevios® K Primer, and conductive polymer dispersion from Example 6 were applied and repeated 4 times. The parts were washed with hot water to remove excess Clevios® K Primer and subsequently dried in oven. The parts were inspected under microscope for corners and edge coverage. A sequential coating of a graphite layer and a silver layer were applied to produce a solid electrolytic capacitor. Parts were assembled and packaged.

Example 17

A series of tantalum anodes (33 microfarads, 35V) were prepared. The tantalum was anodized to form a dielectric on the tantalum anode. The anodes thus formed were dipped into a solution of iron (III) toluenesulfonate oxidant for 1 minute and sequentially dipped into ethyldioxythiophene monomer for 1 minute to form a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. A commercial conductive polymer dispersion Clevios® KV2 was applied to form an external polymer layer. After drying, alternating layers of a commercial crosslinker solution, Clevios® K Primer, and conductive polymer dispersion from Example 6 were applied and repeated 4 times. The parts were washed with hot water to remove excess Clevios® K Primer and subsequently dried in an oven. The parts were inspected under microscope for corners and edge coverage. A sequential coating of a graphite layer and a silver layer were applied to produce a solid electrolytic capacitor. Parts were assembled and packaged.

The performance results of inventive conductive polymer dispersion in solid electrolytic capacitor are summarized in Table 1 and Table 2.

TABLE 1

Effect of bimodal particle size distribution on coverage.

|  | Coverage |
| --- | --- |
| Example 11 | 100% |
| Example 12 | 100% |
| Example 13 | 85% |
| Example 14 | 90% |
| Example 15 | 90% |

TABLE 2

ESR and Leakage reliability under humid atmosphere

|  | Load 85° C./ 85% RH Mean ESR (mΩ) | | Biased HAST leakage failure | |
| --- | --- | --- | --- | --- |
|  | 0 Hr ESR | 1000 Hrs | No. of failed pcs at 0 Hr | No. of failed pcs at 63 Hrs |
| Example 12 | 32.1 | 37.4 | 0/20 | 0/20 |
| Example 16 | 27.1 | 71.1 | 0/20 | 3/20 |
| Example 17 | 31.7 | 1426 | 0/20 | 4/20 |

The advantages of the dispersion with at least a bi-modal size distribution are manifest in improvements in the coating quality and performance of the solid electrolytic capacitor. The invention has been described with reference to the preferred embodiments without limit thereto. One of skill in the art would realize additional embodiments and improvements which are within the metes and bounds of the invention as more specifically set forth in the claims appended hereto,

The invention claimed is:
1. A capacitor comprising:
an anode foil; and
a conductive polymer layer on said anode foil wherein said conductive polymer layer comprises first particles comprising conductive polymer and polyanion and second particles comprising said conductive polymer and said polyanion wherein said first particles have an average particle diameter of at least 1 micron to no more than 10 microns and said second particles have an average particle diameter of at least 1 nm to no more than 600 nm.
2. The capacitor of claim 1 wherein said conductive polymer layer comprises an internal polymer layer and an external polymer layer and said internal polymer comprises pre-polymerized conductive polymer.
3. The capacitor of claim 2 wherein said external polymer layer comprises said first particles.
4. The capacitor of claim 2 wherein said external polymer layer comprises said second particles.
5. The capacitor of claim 2 wherein said internal polymer layer comprises said second particles.
6. The capacitor of claim 2 wherein said external polymer layer comprises pre-polymerized conductive polymer.
7. The capacitor of claim 2 wherein said internal polymer layer and said external polymer layer are free of in-situ polymerized conducting polymer.
8. The capacitor of claim 1 further comprising forming a layer comprising an organometallic compound.
9. The capacitor of claim 8 wherein said layer comprising an organometallic compound is formed on said anodized anode.
10. The capacitor of claim 8 wherein said layer comprising an organometallic compound is formed on at least one said conductive polymer layer.
11. The capacitor of claim 1 further comprising a layer comprising an organometallic compound on said anodized anode wherein said conductive polymer layer is on said organometallic compound layer.
12. The capacitor of claim 11 wherein said organometallic compound is selected from organofunctional silanes, hydrolyzates or phosphates.
13. The capacitor of claim 1 wherein said polyanion is represented by Formula 2:

$$A_xB_yC_z \quad \text{Formula 2}$$

wherein:
A is polystyrenesulfonic acid or salt of polystyrenesulfonate;
B and C separately represent polymerized units substituted with a group selected from:
-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and —(CHR⁷CH₂O)ᵦ—R⁸ wherein:
R⁷ is selected from a hydrogen or an alkyl of 1 to 7 carbons;
b is an integer from 1 to the number sufficient to provide a molecular weight of up to 200,000 for the —CHR⁷CH₂O— group; and
R⁸ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR⁹ wherein:
R⁹ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C₆H₄—R¹⁰ wherein:
R¹⁹ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and
—(O(CHR¹¹CH₂O)_d—R¹² wherein:
R¹¹ is a hydrogen or an alkyl of 1 to 7 carbons;
d is an integer from 1 to the number sufficient to provide a molecular weight of up to 200,000 for the CHR¹¹CH₂O— group;
R¹² is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C₆H₄—O—R¹³ wherein:
R¹³ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—(CHR¹⁴CH₂O)_e—R¹⁵ wherein:
R¹⁴ is a hydrogen or an alkyl of 1 to 7 carbons;
e is an integer from 1 to the number sufficient to provide a molecular weight of up to 200,000 for the —CHR¹⁴CH₂O— group; and
R¹⁵ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100.

14. The capacitor of claim 13 wherein said y is zero and said z is zero.
15. The capacitor of claim 1 wherein said anode foil is wound with a cathode and a separator between said conductive polymer layer on said anode foil and said cathode.
16. The capacitor of claim 15 wherein said separator is a conductive separator.
17. The capacitor of claim 15 wherein said separator is impregnated by or coated with said conductive polymer layer.
18. The capacitor of claim 15 wherein said cathode is coated with said conductive polymer layer.
19. The capacitor of claim 15 further comprising an impregnating electrolyte.
20. The capacitor of claim 19 wherein said impregnating electrolyte is selected from a liquid electrolyte and a gel electrolyte.
21. The capacitor of claim 19 wherein said capacitor is selected from the group consisting of an axial capacitor and a radial capacitor.
22. The capacitor of claim 15 wherein said capacitor further comprising at least one anode tab in electrical contact with said anode foil.
23. The capacitor of claim 22 wherein said capacitor comprises multiple anode tabs in electrical contact with said anode foil.
24. The capacitor of claim 1 wherein said anode foil is an anodized anode foil wherein said conductive polymer layer is on said anodized anode foil.
25. The capacitor of claim 24 wherein a portion of said anode foil is not coated with said conductive polymer thereby providing an uncoated portion of said anode foil.
26. The capacitor of claim 25 comprising a second anode foil wherein a portion of said second anode foil is not coated providing an uncoated portion of said second anode foil wherein said uncoated portion of said anode foil and said uncoated portion of said second anode foil are fused.
27. The capacitor of claim 1 wherein said anode foil is a conductive foil.
28. A capacitor comprising:
an anodized anode wherein said anodized anode is selected from a pressed powder and a foil; and
a conductive polymer layer on said anodized anode wherein said conductive polymer layer comprises first particles comprising conductive polymer and polyanion and second particles comprising said conductive polymer and said polyanion wherein said first particles have an average particle diameter of at least 1 micron to no more than 10 microns and said second particles have an average particle diameter of at least 1 nm to no more than 600 nm;
wherein said polyanion is represented by Formula 2:

$$A_xB_yC_z \qquad \text{Formula 2}$$

wherein:
A is polystyrenesulfonic acid or salt of polystyrenesulfonate;
B and C separately represent polymerized units substituted with a group selected from:
-carboxyl groups;
—C(O)OR⁶ wherein R⁶ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and —(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$O— group; and
R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{10}$ wherein:
R$^{10}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and
—(O(CHR$^{11}$CH$_2$O)$_d$—R$^{12}$ wherein:
R$^{11}$ is a hydrogen or an alkyl of 1 to 7 carbons;
d is an integer from 1 to the number sufficient to provide a molecular weight of up to 200,000 for the —CHR$^{11}$CH$_2$O— group;
R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
R$^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—(CHR$^{14}$CH$_2$O)$_e$—R$^{15}$ wherein:
R$^{14}$ is a hydrogen or an alkyl of 1 to 7 carbons;
e is an integer from 1 to the number sufficient to provide a molecular weight of up to 200,000 for the —CHR$^{14}$CH$_2$O— group; and
R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100.

29. The capacitor of claim 28 wherein y represents 10 to 30% and z represents 0 to 20% of the sum total of x+y+z.

30. The capacitor of claim 28 further comprising an internal polymer layer and an external polymer layer.

31. The capacitor of claim 30 wherein said external polymer layer comprises said polyanion.

32. The capacitor of claim 30 wherein said external polymer layer comprises said first particles.

33. The capacitor of claim 30 wherein said external polymer layer does not comprise said second particles.

34. The capacitor of claim 30 wherein said internal polymer layer comprises said second particles.

35. The capacitor of claim 30 wherein said external polymer layer is coated on said internal polymer layer.

36. The capacitor of claim 35 wherein at least one of said internal polymer layer or said external polymer layer comprises pre-polymerized conducting polymer.

37. The capacitor of claim 36 wherein said internal polymer layer and external polymer layer are free of in-situ polymerized conducting polymer.

38. The capacitor of claim 28 further comprising applying a layer comprising an organometallic compound.

39. The capacitor of claim 38 wherein said layer comprising an organometallic is applied between said anodized anode and a pre-polymerized conductive polymer layer.

40. The capacitor of claim 38 wherein said layer comprising an organometallic is applied on a pre-polymerized conductive polymer layer.

41. The capacitor of claim 38 wherein said organometallic compound selected from organofunctional silanes hydrolyzates or phosphates.

42. The capacitor of claim 28 wherein said anode foil is wound with a cathode and a separator between said conductive polymer layer on said anode foil and said cathode.

43. The capacitor of claim 42 wherein said separator is a conductive separator.

44. The capacitor of claim 42 wherein said separator is impregnated by or coated with said conductive polymer layer.

45. The capacitor of claim 42 wherein said cathode is coated with said conductive polymer layer.

46. The capacitor of claim 42 further comprising an impregnating electrolyte.

47. The capacitor of claim 46 wherein said impregnating electrolyte is selected from the group consisting of a liquid electrolyte and a gel electrolyte.

48. The capacitor of claim 46 wherein said capacitor is selected from the group consisting of an axial capacitor and a radial capacitor.

49. The capacitor of claim 28 wherein said capacitor further comprising at least one anode tab in electrical contact with said anode foil.

50. The capacitor of claim 49 wherein said capacitor comprises multiple anode tabs in electrical contact with said anode foil.

51. The capacitor of claim 28 wherein said anode foil is an anodized anode foil wherein said conductive polymer layer is on said anodized anode foil.

52. The capacitor of claim 51 wherein a portion of said anode foil is not coated with said conductive polymer thereby providing an uncoated portion of said anode foil.

53. The capacitor of claim 52 comprising a second anode foil wherein a portion of said second anode foil is not coated providing an uncoated portion of said second anode foil wherein said uncoated portion of said anode foil and said uncoated portion of said second anode foil are fused.

54. The capacitor of claim 28 wherein said anode foil is a conductive foil.

\* \* \* \* \*